(12) United States Patent
Lee et al.

(10) Patent No.: US 10,403,280 B2
(45) Date of Patent: Sep. 3, 2019

(54) LAMP DEVICE FOR INPUTTING OR OUTPUTTING VOICE SIGNAL AND METHOD OF DRIVING THE SAME

(71) Applicant: Samsung Electronics Co., Ltd., Suwon-si (KR)

(72) Inventors: Yohan Lee, Seongnam-si (KR); Jungkyun Ryu, Suwon-si (KR); Junho Park, Seoul (KR); Wonsik Song, Seoul (KR); Seungyong Lee, Suwon-si (KR); Youngsu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/829,417

(22) Filed: Dec. 1, 2017

(65) Prior Publication Data

US 2018/0158460 A1    Jun. 7, 2018

(30) Foreign Application Priority Data

Dec. 1, 2016  (KR) .......................... 10-2016-0162769

(51) Int. Cl.
  *G10L 15/00*  (2013.01)
  *G10L 15/22*  (2006.01)
  *H05B 37/02*  (2006.01)

(52) U.S. Cl.
  CPC .......... *G10L 15/22* (2013.01); *H05B 37/0236* (2013.01); *H05B 37/0272* (2013.01); *G10L 2015/223* (2013.01); *G10L 2015/225* (2013.01)

(58) Field of Classification Search
  CPC ................................ G10L 15/30; G10L 15/32
  USPC ........................................................ 704/275
  See application file for complete search history.

(56) References Cited

U.S. PATENT DOCUMENTS

| 6,408,272 B1* | 6/2002 | White .................... G10L 15/30 704/270.1 |
| 9,542,944 B2* | 1/2017 | Jablokov ............ G06Q 30/0251 |
| 2001/0041982 A1* | 11/2001 | Kawasaki ............... G10L 15/26 704/275 |
| 2013/0253925 A1 | 9/2013 | Jonsson |
| 2016/0217786 A1* | 7/2016 | Jablokov ............ G06Q 30/0251 |

FOREIGN PATENT DOCUMENTS

| KR | 20010104252 A | 11/2001 |
| KR | 20080096239 A | 10/2008 |
| KR | 20150127314 A | 11/2015 |
| KR | 20160100656 A | 8/2016 |

\* cited by examiner

*Primary Examiner* — Daniel Abebe

(57) ABSTRACT

A lamp device for inputting or outputting a voice signal and a method of driving the same. The method of driving a lamp device includes receiving an audio signal; performing voice recognition of a first audio signal among the received audio signals; generating an activation signal based on the voice recognition result; transmitting the activation signal to the external device; receiving a first control signal from the external device; and transmitting a second audio signal among the received audio signals to the external device in response to the first control signal. Alternatively, various exemplary embodiment may be further included.

20 Claims, 30 Drawing Sheets

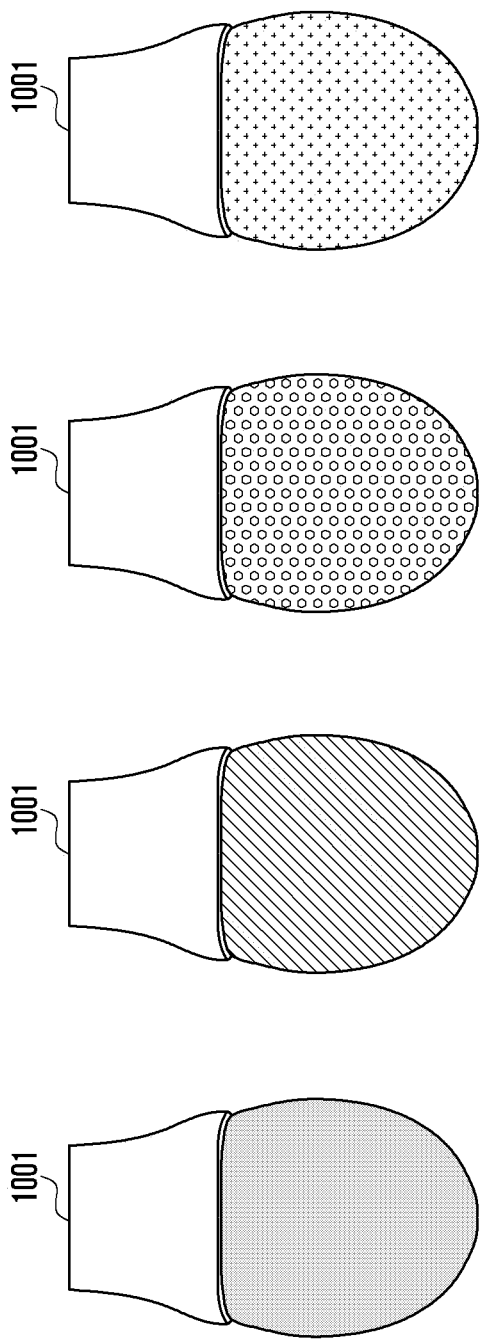

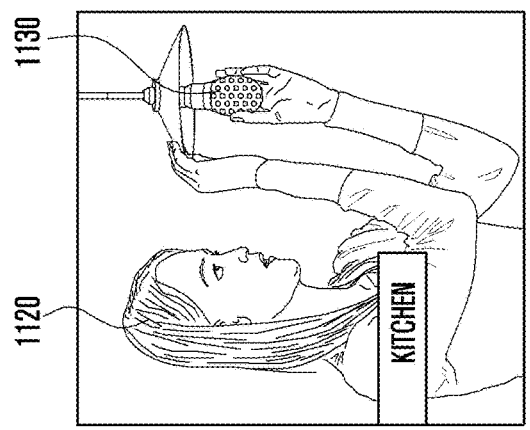
FIG. 11A
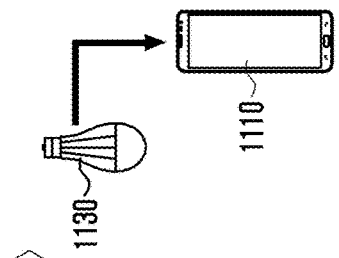
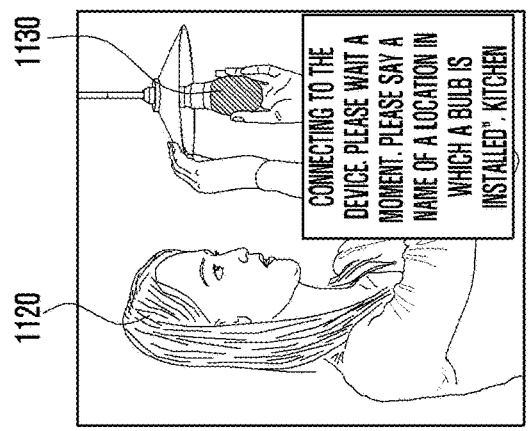
FIG. 11B
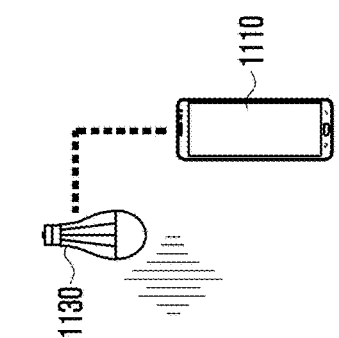
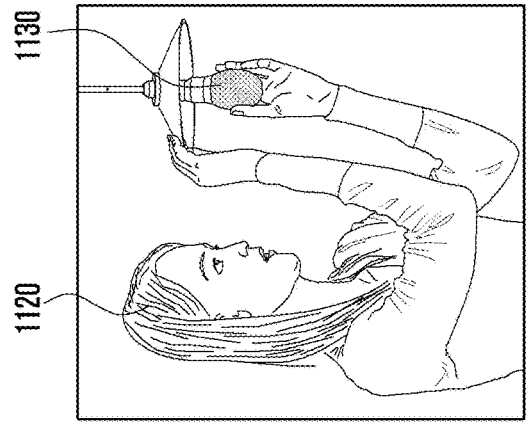
FIG. 11C
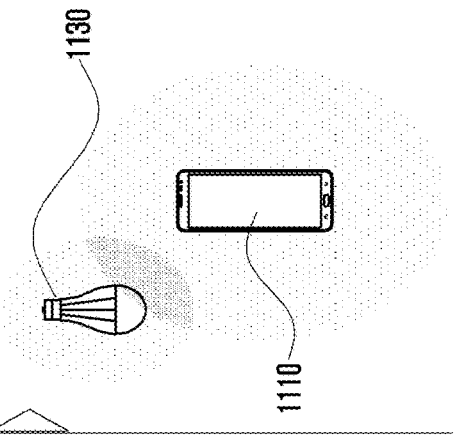
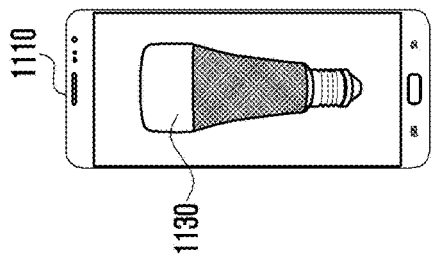
FIG. 11D
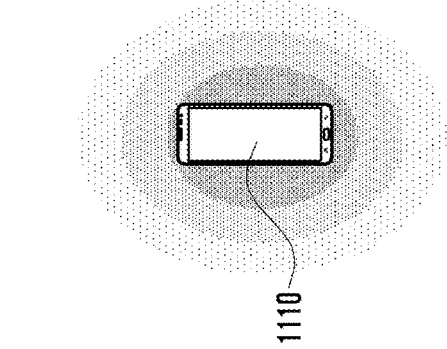

FIG. 12A
FIG. 12B
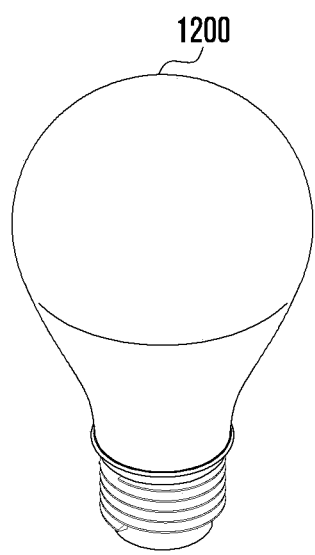
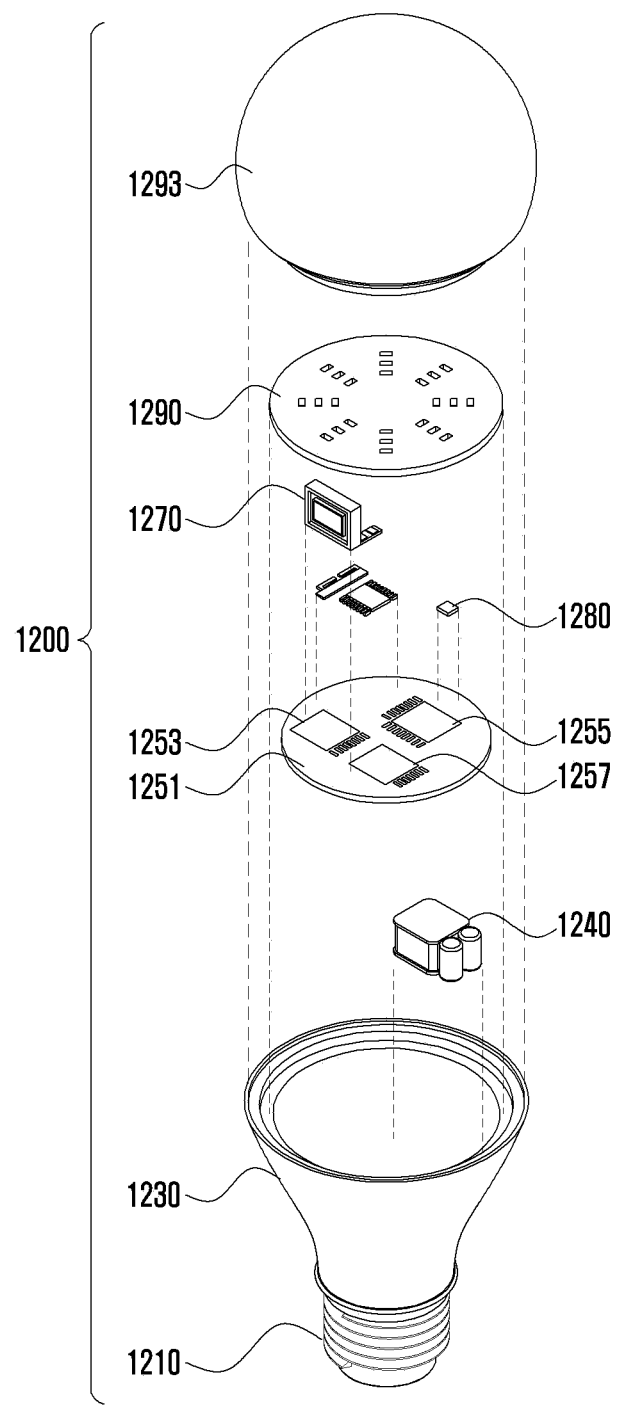

FIG. 19
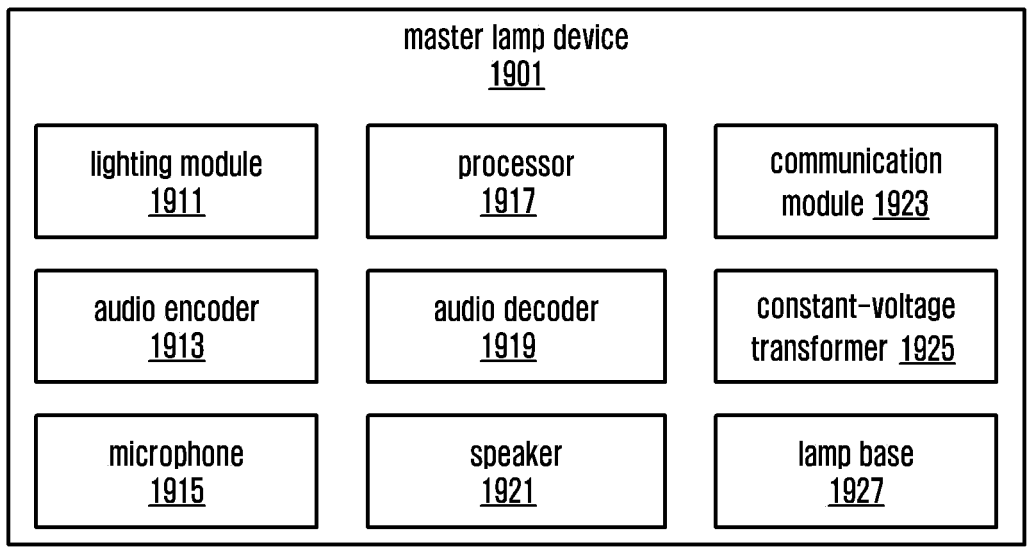
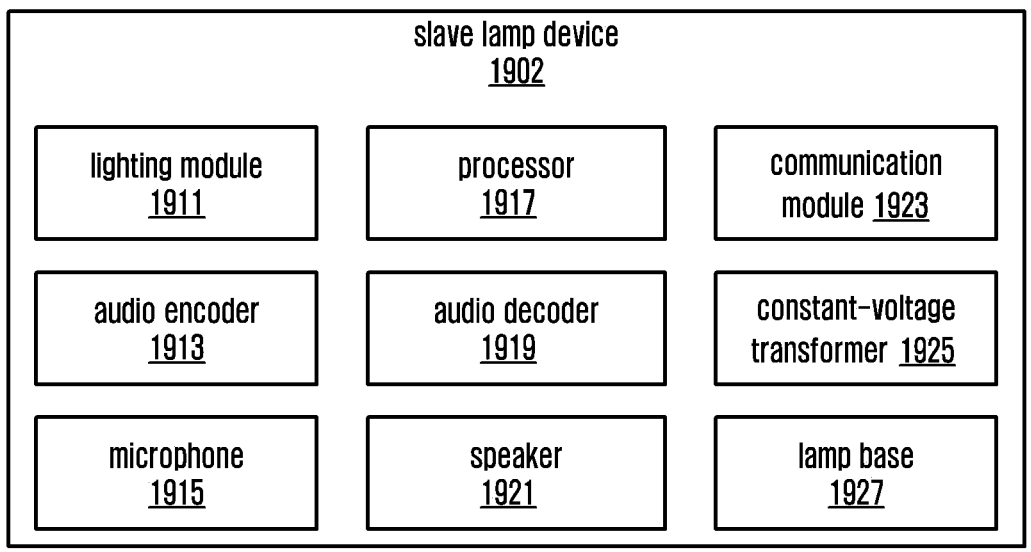

FIG. 22
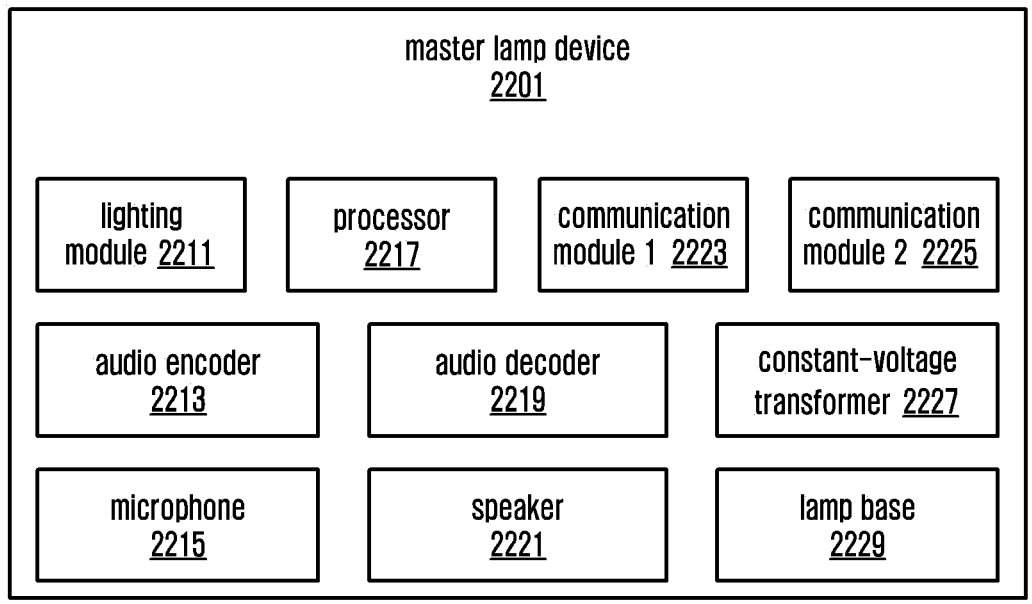
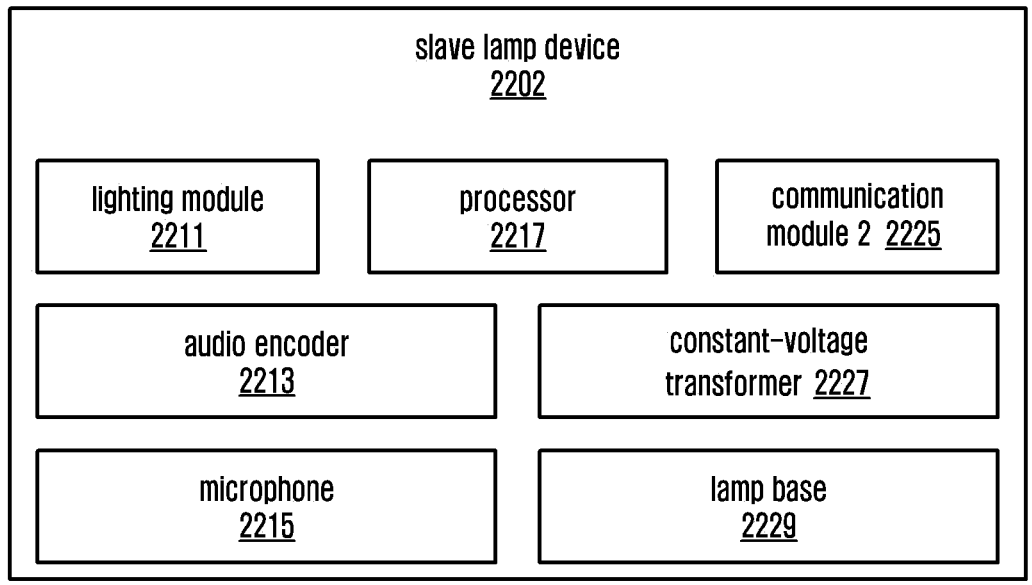

US 10,403,280 B2

LAMP DEVICE FOR INPUTTING OR OUTPUTTING VOICE SIGNAL AND METHOD OF DRIVING THE SAME

CROSS-REFERENCE TO RELATED APPLICATION(S)

This application is related to and claims priority to Korean Patent Application No. 10-2016-0162769 filed Dec. 1, 2016, the entire disclosure of which is hereby incorporated by reference.

TECHNICAL FIELD

Various exemplary embodiments of the present disclosure relate to a lamp device for inputting or outputting a voice signal and a method of driving the same.

BACKGROUND

Nowadays, various services and additional functions provided by electronic devices have been gradually enlarged. In order to enhance a use value of such an electronic device and to satisfy user various needs, communication service providers or electronic device producers provide more various functions, and for product differentiation from other companies, electronic device producers have competitively developed an electronic device. As one example of satisfying such user needs, the electronic device may recognize a user voice command and provide various service information to the user based on the recognized voice command.

A system and method for providing a voice-based service may provide a service at only some limited space of a periphery of an electronic device. Therefore, when a user is located at a location other than some limited space in which the electronic device is located, the user may not substantially receive a voice-based service.

SUMMARY

To address the above-discussed deficiencies, it is a primary object to provide a lamp device for inputting or outputting a voice signal that can provide a voice-based service to a user regardless of a location and a method of driving the same.

In accordance with an aspect of the present disclosure, a lamp device includes a lighting module; a lamp base; a memory; a microphone; a speaker; a communication circuit; and a processor electrically connected to the lighting module, the lamp base, the memory, the microphone, the speaker, and the communication circuit, wherein the processor receives an audio signal from the microphone, performs voice recognition of a first audio signal among the received audio signals, generates an activation signal based on the voice recognition result, transmits the activation signal to an external device through the communication circuit, receives a first control signal from the external device, and transmits a second audio signal among the received audio signals to the external device in response to the first control signal.

In accordance with another aspect of the present disclosure, a method of driving a lamp device includes receiving an audio signal; performing voice recognition of a first audio signal among the received audio signals; generating an activation signal based on the voice recognition result; transmitting the activation signal to the external device; receiving a first control signal from the external device; and transmitting a second audio signal among the received audio signals to the external device in response to the first control signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A-10D illustrate diagrams of an operation state of a lamp device according to an exemplary embodiment of the present disclosure;

FIGS. 11A-11D illustrates diagrams of an installation method of a lamp device according to an exemplary embodiment of the present disclosure;

FIG. 12A illustrates a perspective view of a lamp device according to an exemplary embodiment of the present disclosure;

FIG. 12B illustrates an exploded perspective view of a structure of the lamp device of FIG. 12A according to an exemplary embodiment of the present disclosure;

FIG. 19 illustrates a block diagram of a configuration of a lamp device divided into a master and a slave according to an exemplary embodiment of the present disclosure;

FIG. 22 illustrates a block diagram of a master lamp device and a slave lamp device divided into a master and a slave according to an exemplary embodiment of the present disclosure;

DETAILED DESCRIPTION

Figure 1:
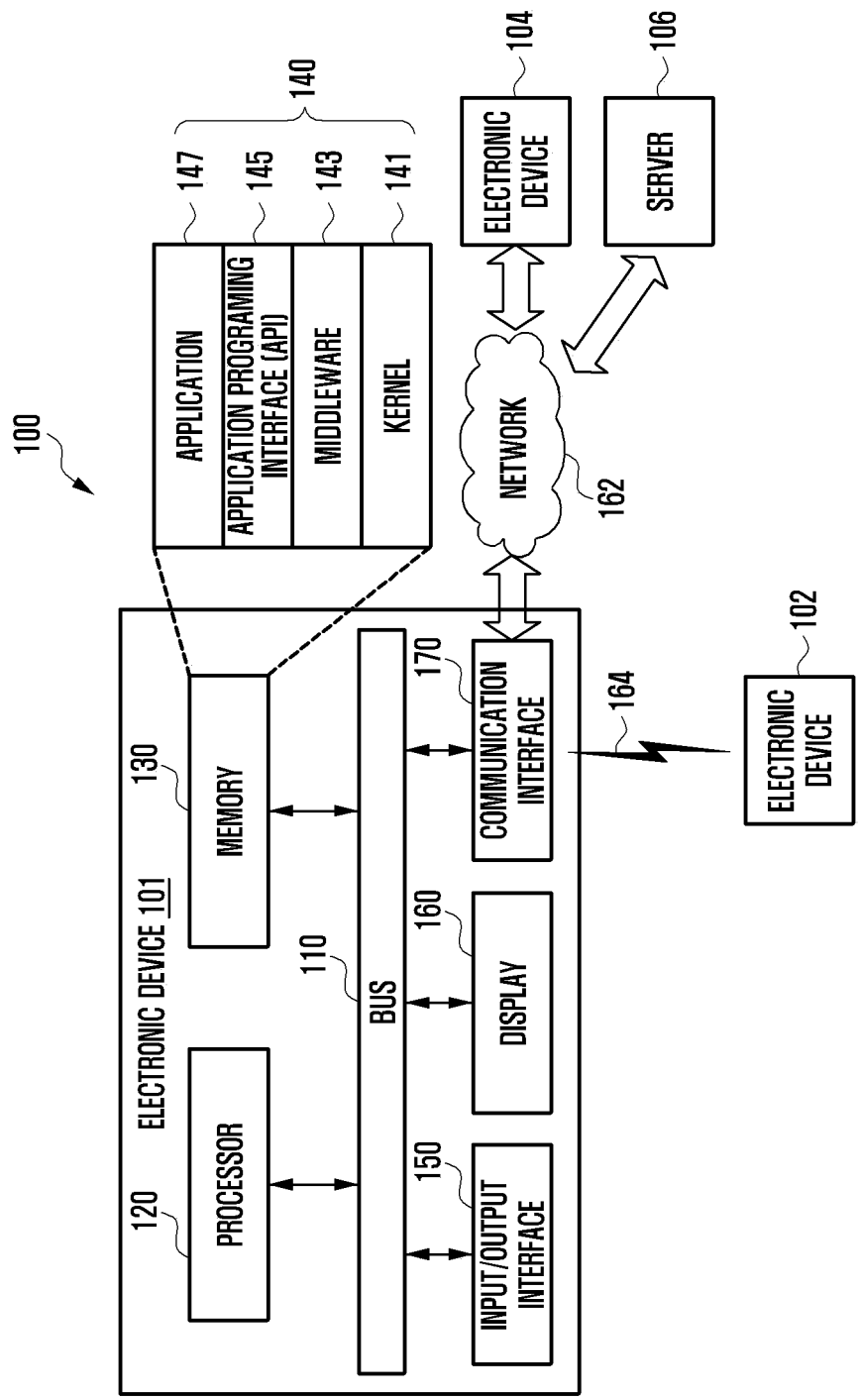
FIG. 1 illustrates a block diagram of a configuration of an electronic device in a network environment according to various exemplary embodiments.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a digital video disk (DVD) player, an audio device, various medical devices (for example, magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a Flight data recorder (FDR), a set-top box, a TV box (for example, SAMSUNG HOMESYNC™, APPLE TV™, or GOOGLE TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 illustrates a block diagram of a configuration of an electronic device according to an embodiment of the present disclosure.

Referring to FIG. 1, the electronic device 100 may include a bus 110, a processor 120, a memory 130, a user input module 150, a display module 160, a communication interface 170, and other similar and/or suitable components.

The bus 110 may be a circuit that interconnects the above-described elements and delivers a communication (e.g., a control message) between the above-described elements.

The processor 120 may receive commands from the above-described other elements (e.g., the memory 130, the user input module 150, the display module 160, the communication interface 170, etc.) through the bus 110, may interpret the received commands, and may execute calculation or data processing according to the interpreted commands.

The memory 130 may store commands or data received from the processor 120 or other elements (e.g., the user input module 150, the display module 160, the communication interface 170, etc.) or generated by the processor 120 or the other elements. The memory 130 may include programming modules, such as a kernel 141, middleware 143, an application programming interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, etc.) used to execute operations or functions implemented by other programming modules 140 (e.g., the middleware 143, the API 145, and the application 147). Also, the kernel 141 may provide an interface capable of accessing and controlling or managing the individual elements of the electronic device 100 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 100 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The user input module 150, for example, may receive a command or data as input from a user, and may deliver the received command or data to the processor 120 or the memory 130 through the bus 110. The display module 160 may display a video, an image, data, or the like to the user.

The communication interface 170 may connect communication between another electronic device 102 and the electronic device 100. The communication interface 170 may support a predetermined short-range communication protocol (e.g., Wi-Fi, BLUETOOTH (BT), and near field communication (NFC)), or predetermined network 162 communication (e.g., the Internet, a local area network (LAN), a wide area network (WAN), a telecommunication network, a cellular network, a satellite network, a plain old telephone service (POTS), or the like). Each of the electronic devices 102 and 104 may be a device that is identical (e.g., of an identical type) to or different (e.g., of a different type) from the electronic device 100. Further, the communication interface 170 may connect communication between a server 106 and the electronic device 100 via the network 162.

Figure 2:
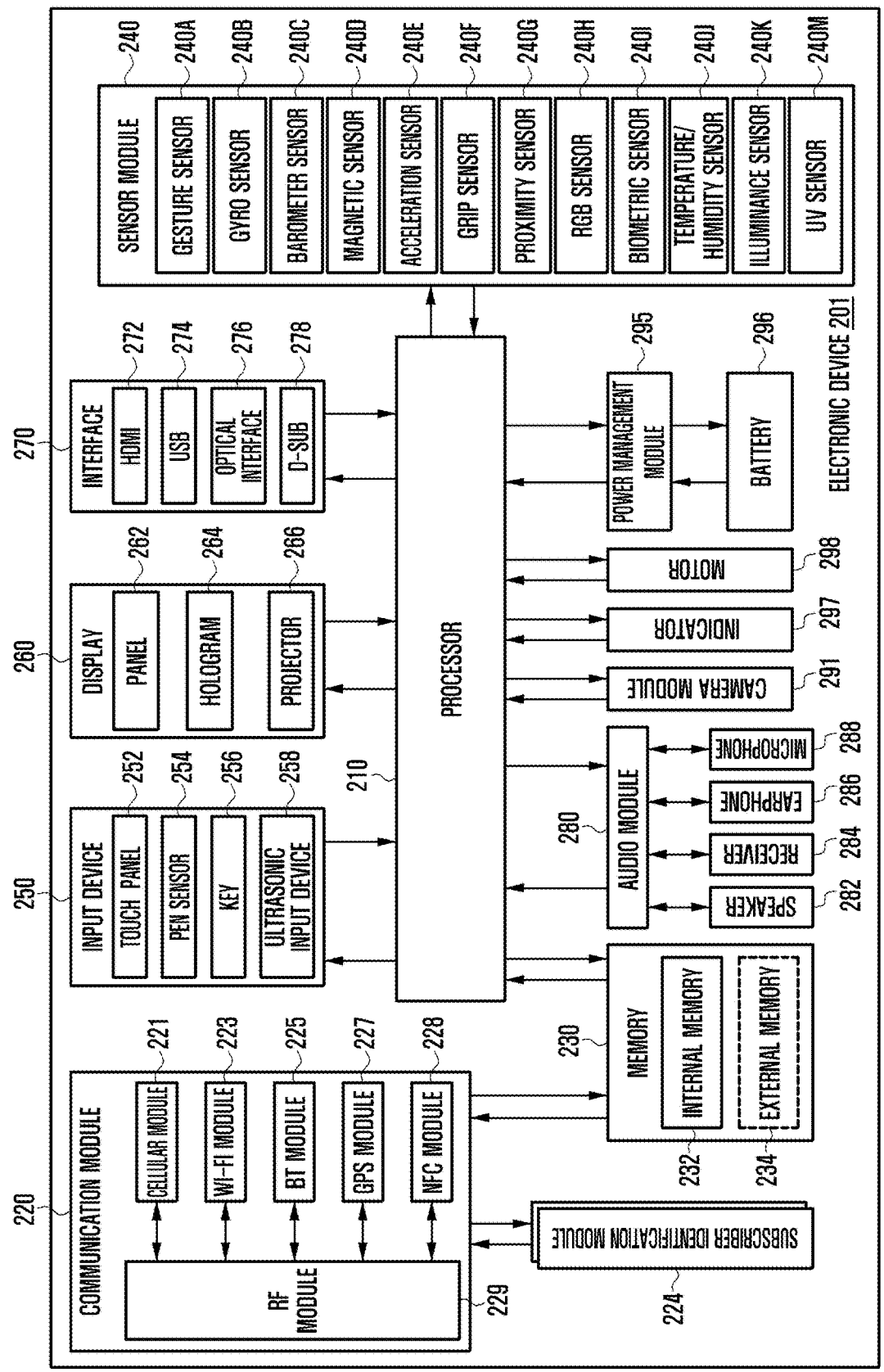
FIG. 2 illustrates a block diagram of a configuration of an electronic device according to various exemplary embodiments.

FIG. 2 illustrates a block diagram of a configuration of an electronic device 201 according to an embodiment of the present disclosure.

The hardware may be, for example, the electronic device 101 illustrated in FIG. 1.

Referring to FIG. 2, the electronic device may include one or more processors 210, a communication module 220, a subscriber identification module (SIM) card 224, a memory 230, a sensor module 240, a input device 250, a display module 260, an interface 270, an audio module 280, a camera module 291, a power management module 295, a battery 296, an indicator 297, a motor 298 and any other similar and/or suitable components.

The application processor (AP) 210 (e.g., the processor 120) may include one or more application processors (APs), or one or more communication processors (CPs). The processor 210 may be, for example, the processor 120 illustrated in FIG. 1. The AP 210 is illustrated as being included in the processor 210 in FIG. 2, but may be included in different integrated circuit (IC) packages, respectively. According to an embodiment of the present disclosure, the AP 210 may be included in one IC package.

The AP 210 may execute an operating system (OS) or an application program, and thereby may control multiple hardware or software elements connected to the AP 210 and may perform processing of and arithmetic operations on various data including multimedia data. The AP 210 may be implemented by, for example, a system on chip (SoC). According to an embodiment of the present disclosure, the AP 210 may further include a graphical processing unit (GPU) (not illustrated).

The AP 210 may manage a data line and may convert a communication protocol in the case of communication between the electronic device (e.g., the electronic device 100) including the hardware 200 and different electronic devices connected to the electronic device through the network. The AP 210 may be implemented by, for example, a SoC. According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 210, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 100. The SIM card 224 may include unique identification information (e.g., integrated circuit card identifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a solid state drive (SSD). The external memory 234 may further include a flash drive, for example, a compact flash (CF), a secure digital (SD), a micro-secure digital (Micro-SD), a mini-secure digital (Mini-SD), an extreme digital (xD), a memory stick, or the like.

The communication module 220 may include a cellular module 221, a wireless communication module 223 or a radio frequency (RF) module 229. The communication module 220 may be, for example, the communication interface 170 illustrated in FIG. 1. The communication module 220 may include, for example, a Wi-Fi part 223, a BT part 225, a GPS part 227, or a NFC part 228. For example, the wireless communication module 223 may provide a wireless communication function by using a radio frequency. Additionally or alternatively, the wireless communication module 223 may include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF unit 229 may include, for example, a transceiver, a power amplifier module (PAM), a frequency filter, a low noise amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an barometer sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and a ultra violet (UV) sensor 240M. The sensor module 240 may measure a physical quantity or may sense an operating state of the electronic device 100, and may convert the measured or sensed information to an electrical signal. Additionally/alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include a touch panel 252, a pen sensor 254 (e.g., a digital pen sensor), keys 256, and an ultrasonic input unit 258. The input device 250 may be, for example, the user input module 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware may receive a user input from an external device (e.g., a network, a computer, or a server), which is connected to the communication module 220, through the communication module 220.

The display module 260 may include a panel 262, a hologram 264, or projector 266. The display module 260 may be, for example, the display module 160 illustrated in FIG. 1. The panel 262 may be, for example, a liquid crystal display (LCD) and an active matrix organic light emitting diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include, for example, a high-definition multimedia interface (HDMI) 272, a universal serial bus (USB) 274, an optical interface 276, and a D-subminiature (D-sub) 278. Additionally or alternatively, the interface 270 may include, for example, SD/multi-media card (MMC) (not illustrated) or infrared data association (IrDA) (not illustrated).

The audio codec 280 may bidirectionally convert between a voice and an electrical signal. The audio codec 280 may convert voice information, which is input to or output from the audio codec 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an image signal processor (ISP) (not illustrated), and a flash LED (not illustrated).

The power management module 295 may manage power of the hardware 200. Although not illustrated, the power management module 295 may include, for example, a power management integrated circuit (PMIC), a charger integrated circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware 200 or a part (e.g., the AP 211) of the hardware 200, for example, a booting state, a message state, a charging state and the like. The motor 298 may convert an electrical signal into a mechanical vibration. The processor 210 may control the sensor module 240.

Although not illustrated, the hardware 200 may include a processing unit (e.g., a GPU) for supporting a module TV. The processing unit for supporting a module TV may process media data according to standards such as, for example, digital multimedia broadcasting (DMB), digital video broadcasting (DVB), media flow, and the like. Each of the above-described elements of the hardware 200 according to an embodiment of the present disclosure may include one or more components, and the name of the relevant element may change depending on the type of electronic device. The hardware according to an embodiment of the present disclosure may include at least one of the above-described elements. Some of the above-described elements may be omitted from the hardware, or the hardware may further include additional elements. Also, some of the elements of the hardware according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations that have been known or are to be developed in the future.

Figure 3:
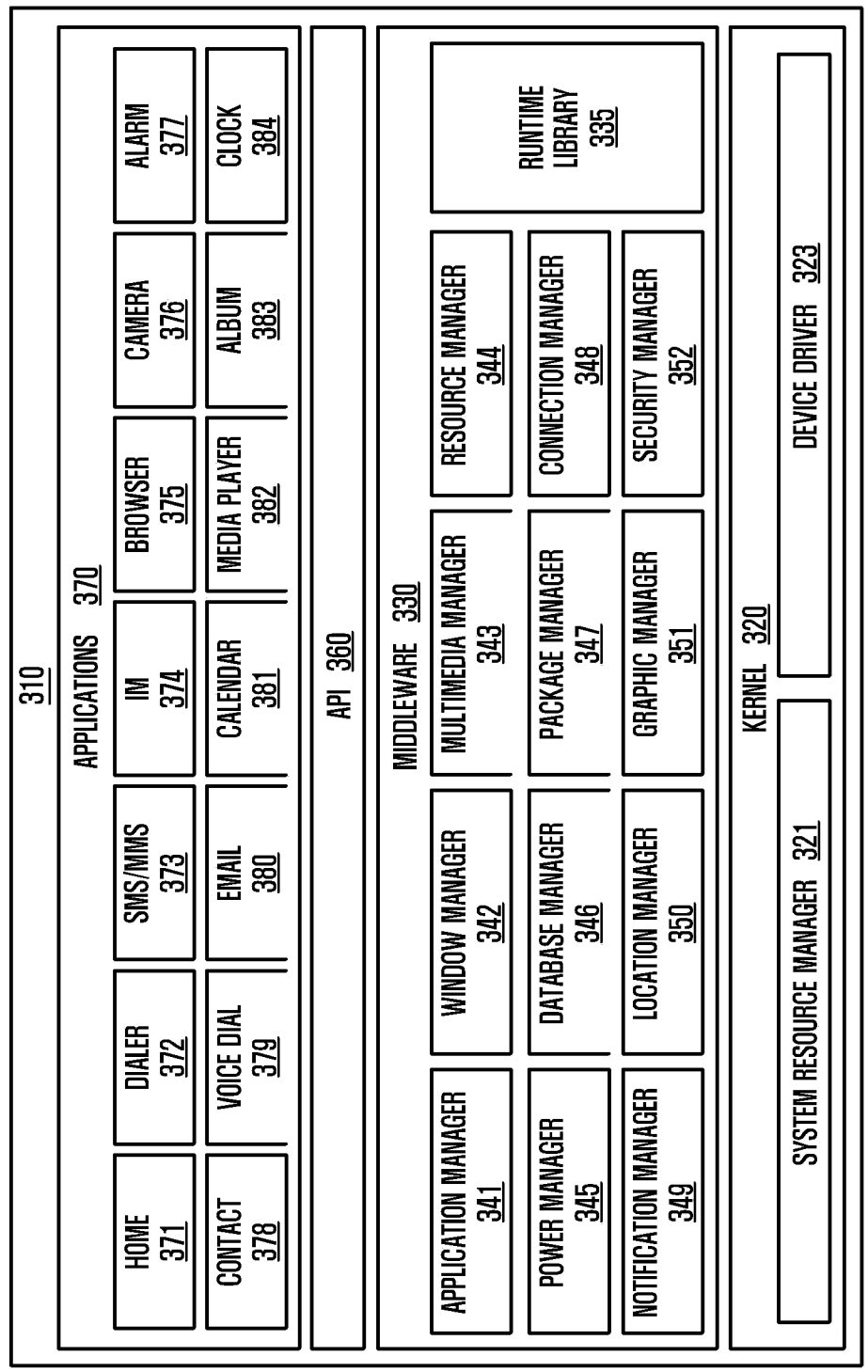
FIG. 3 illustrates a block diagram of a configuration of a program module according to various exemplary embodiments.

FIG. 3 illustrates a block diagram of a configuration of a programming module 310 according to an embodiment of the present disclosure.

The programming module 310 may be included (or stored) in the electronic device 100 (e.g., the memory 130) or may be included (or stored) in the electronic device 201 (e.g., the memory 230) illustrated in FIG. 1. At least a part of the programming module 310 may be implemented in software, firmware, hardware, or a combination of two or more thereof. The programming module 310 may be implemented in hardware (e.g., the hardware 200), and may include an OS controlling resources related to an electronic device (e.g., the electronic device 100) and/or various applications (e.g., an application 370) executed in the OS. For example, the OS may be ANDROID, iOS, WINDOWS, SYMBIAN, TIZEN, BADA, and the like.

Referring to FIG. 3, the programming module 310 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BLUETOOTH driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions that are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of TIZEN, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Names of the elements of the programming module (e.g., the programming module 310) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

A lamp device according to various exemplary embodiments of the present disclosure includes a lighting module; a lamp base; a memory; a microphone; a speaker; a communication circuit; and a processor electrically connected to the lighting module, the lamp base, the memory, the microphone, the speaker, and the communication circuit, wherein the processor receives an audio signal from the microphone, performs voice recognition of a first audio signal among the received audio signals, generates an activation signal based on the voice recognition result, transmits the activation signal to an external device through the communication circuit, receives a first control signal from the external device, and transmits a second audio signal among the received audio signals to the external device in response to the first control signal.

The processor may receive the second control signal from the external device and stop transmitting the second audio signal in response to the second control signal.

The processor may receive a third control signal including voice feedback information from the external device and output a voice feedback signal through the speaker based on the third control signal.

The processor may receive a first control signal from the external device, output a first light type through the lighting module based on the first control signal, receive a second control signal from the external device, output a second light type through the lighting module based on the second control signal, receive a third control signal from the external device, and output a third light type through the lighting module based on the third control signal.

The first audio signal may include a trigger voice, and the processor may determine whether the first audio signal includes a trigger voice stored at the memory.

The second audio signal may include an audio signal of a specific segment determined based on a segment including the trigger voice among the received audio signals.

The second audio signal may be a voice signal including a natural language sentence spoken by the user.

The voice feedback signal may include a signal generated by a natural language understanding (NLU) device, natural language processing (NLP) device, or artificial intelligence (AI) device in response to the second audio signal.

The communication circuit may include a first communication circuit and a second communication circuit that support wireless communication of different methods, wherein the processor may communicate with the external device through the first communication circuit and communicate with another lamp device through the second communication circuit.

The lamp device may further include an audio encoder configured to process the audio signal to generate digital voice data; and an audio decoder configured to decode a feedback signal provided from the external device to generate the voice feedback.

A lamp device according to various exemplary embodiments of the present disclosure includes a lighting module; a microphone; a speaker; a communication circuit; and a processor electrically connected to the lighting module, the microphone, the speaker, and the communication circuit; wherein the processor is activated in response to interruption received from another lamp device, controls the lighting module to output a first light type in response to a first control signal received from an external device, receives an audio signal to transmit the audio signal to the external device, controls the lighting module to output a second light type and stops performing the voice recognition in response to a second control signal received from the external device, and controls to output a third light type and outputs voice feedback through the speaker in response to a third control signal received from the external device.

Figure 4:
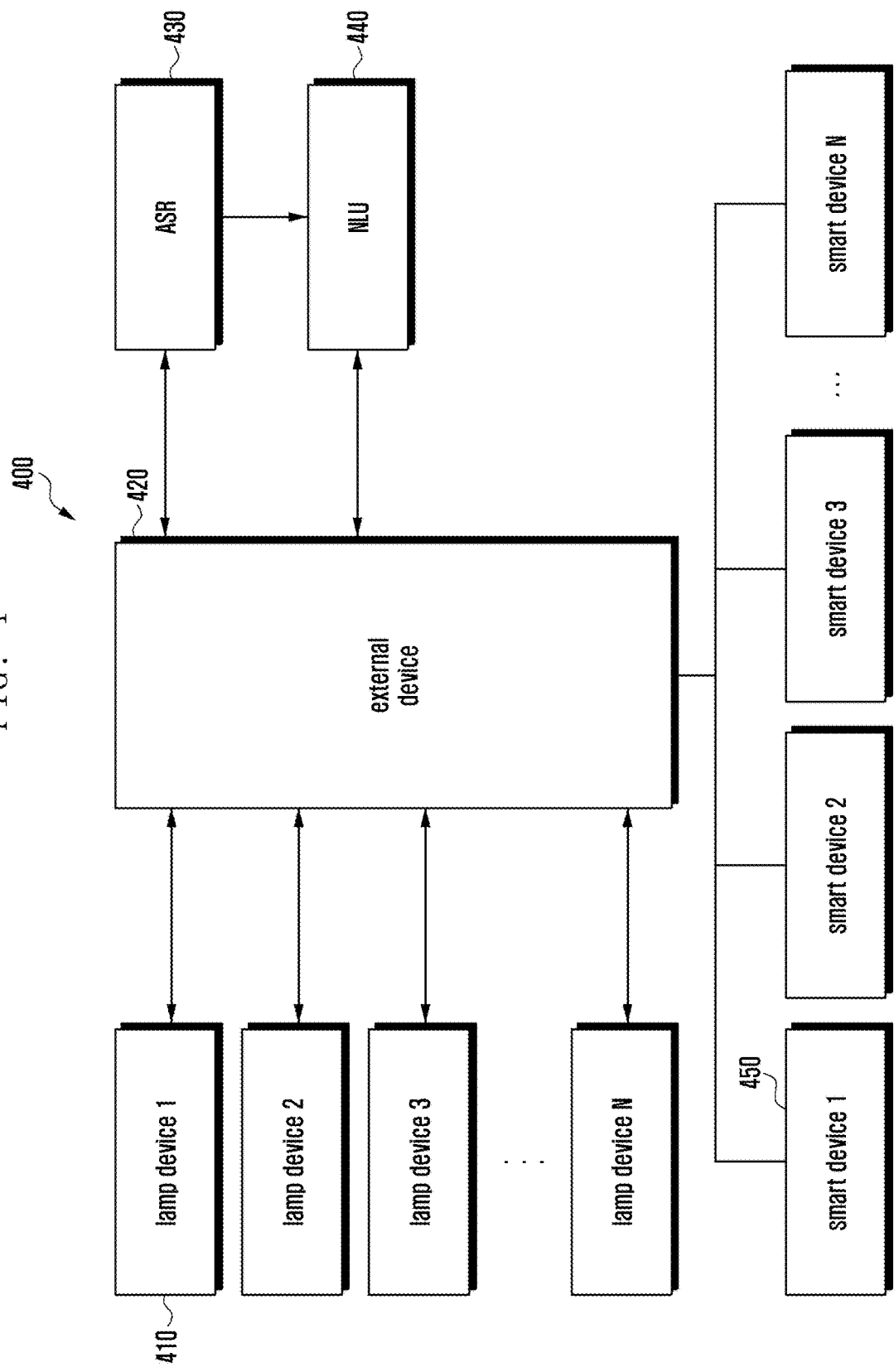
FIG. 4 illustrates a block diagram of a configuration of a voice control system according to various exemplary embodiments of the present disclosure.
Figure 5:
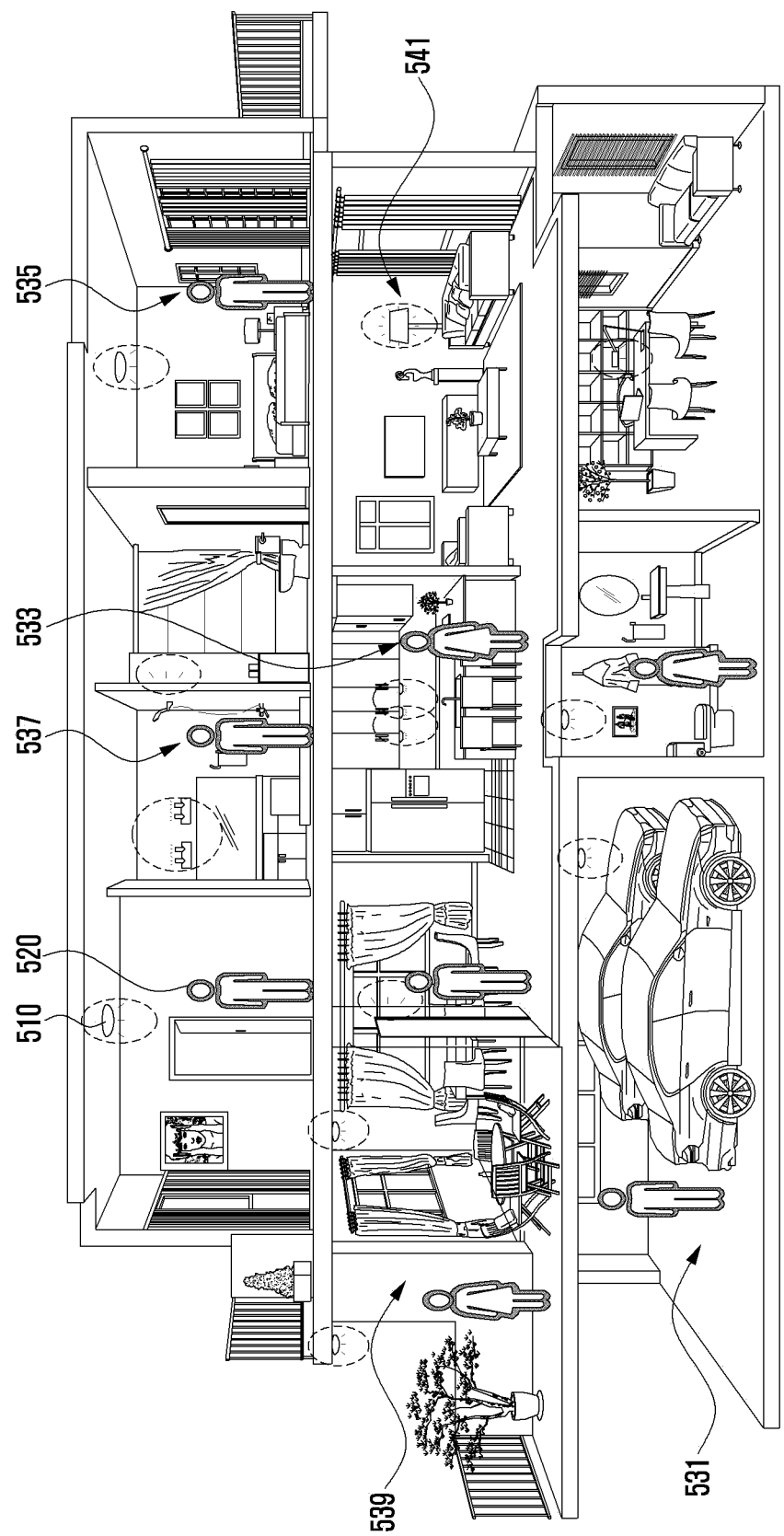
FIG. 5 illustrates a diagram of a constructed voice control system according to various exemplary embodiments of the present disclosure.

FIG. 4 illustrates a block diagram of a configuration of a voice control system according to various exemplary embodiments of the present disclosure and FIG. 5 illustrates a diagram of a constructed voice control system according to various exemplary embodiments of the present disclosure.

With reference to FIG. 4, a voice control system 400 according to various exemplary embodiments of the present disclosure may include a lamp device 410, external device 420, automatic speech recognition (ASR) device 430, natural language understanding (NLU) device 440, or smart device 450.

The lamp device 410 may be a bulb for lighting a building or a specific space or a device for driving (or controlling) the bulb. The lamp device 410 may have a microphone or a speaker. The lamp device 410 may receive a user voice command through a microphone and transmit data based on the received voice command to the external device 420. The external device 420 may output a control signal for controlling at least one lamp device 410 or another device (e.g., the smart device 450) based on the received data. The control signal may be supplied from the external device 420 to the lamp device 410 to enable the lamp device 410 to control another device. Alternatively, the control signal may be directly supplied from the external device 420 to another device to enable the external device 420 to control another device. When a control signal is provided from the external device 420, the lamp device 410 may output a signal for directly controlling the lamp device 410 or another device.

Further, the external device 420 may generate voice feedback data based on received data and transmit the generated voice feedback data to at least one lamp device 410. The lamp device 410 may output a voice based on voice feedback data received from the external device 420 through a speaker.

According to various exemplary embodiments of the present disclosure, a plurality of lamp devices 410 may be provided to be disposed at a building or a specific space. For example, as shown in FIG. 5, the lamp device 410 may be a plurality of bulbs 510 disposed at each space of a building or a house. FIG. 5 illustrates a building environment including a garage 531, kitchen 533, private room 535, bathroom 537, terrace 539, or living room 541. Because the lamp device 410 configured with a plurality of bulbs 510 is disposed at each space of a building or a house, a user 520 may use a voice-based service regardless of a location through the plurality of bulbs 510. Alternatively, the lamp device 410 may be a bulb socket, lighting switch, or power socket for driving (or controlling) the plurality of bulbs 510 disposed at each space within a building.

The external device 420 may control a plurality of lamp devices 410 or another device. The another device may be, for example, the smart device 450 connected to communicate with the external device 420. The external device 420 may output a command or a control signal for controlling the plurality of lamp devices 410 and the smart device 450. The external device 420 may communicate with the plurality of lamp devices 410, the ASR device 430, or the NLU device 440 through wireless communication or wire communication. For example, the external device 420 may communicate with the plurality of lamp devices 410, the ASR device 430, the NLU device 440, or the smart device 450 through short range communication (e.g., wireless fidelity (WiFi), Bluetooth, Bluetooth low energy (BLE), zigbee, or near field communication (NFC). According to any exemplary embodiment, the external device 420 may be formed in a cloud server form and be disposed at the outside of a building.

The external device 420 may transmit data based on a received user voice command to the ASR device 430 or the NLU device 440 to request data analysis. The external device 420 may receive data according to an analysis result from the ASR device 430 or the NLU device 440 and control the plurality of lamp devices 410 and the smart device 450 based on the received analysis data. According to an exemplary embodiment, the external device 420 may be the same as or similar to the electronic device 101 of FIG. 1 and may be, for example, a smart phone. Alternatively, the external device 420 may be a home gateway. The home gateway may be connected to a plurality of electronic devices (e.g., the electronic device 101) disposed within a house to control the plurality of electronic device. The home gateway may have, for example, a settop box form and may be provided with a single gateway or a plurality of gateways. For example, the home gateway may have a configuration similar to that disclosed in Korean Patent Laid-Open Publication No. 10-2016-0028740.

The ASR device 430 may perform voice recognition of voice data provided from the external device 420. The ASR device 430 may perform isolated word recognition, connected word recognition, or large vocabulary recognition of voice data. Voice recognition performed by the ASR device 430 may be speaker independently implemented or may be speaker dependently implemented. The ASR device 430 may be configured with a single voice recognition engine or a plurality of voice recognition engines. When the ASR device 430 includes a plurality of voice recognition engines, each voice recognition engine may have a different recognition object. For example, one voice recognition engine may recognize a wakeup speech, for example, "Hi, Galaxy" for activating an ASR function and another one voice recognition engine may recognize a voice command speech.

The NLU device 440 may mechanically analyze a language phenomenon in which a human speeches to perform a language understanding operation that converts to a form in which a computer can understand. The NLU device 440 may perform a natural language processing operation that converts a language of a form in which a computer can understand to a language in which a human can understand. According to an exemplary embodiment, the NLU device 440 may perform an operation of generating command information for controlling a specific device based on an understood language in addition to a natural language processing operation or feedback voice information to provide to a human (user).

According to various exemplary embodiments of the present disclosure, at least one of the ASR device 430 and the NLU device 440 may be configured with an artificial intelligence (AI) engine. Alternatively, at least one of the ASR device 430 and the NLU device 440 may be at least a portion of an AI engine.

The smart device 450 may be an Internet of Things (IoT) based electronic device. For example, the smart device 450 may be at least one of a bulb, various sensors, a sprinkler device, a fire alarm, a temperature regulator, a street light, a toaster, a sporting equipment, a hot water tank, a heater, and a boiler. According to an exemplary embodiment, the smart device 450 may be an electronic device that can be disposed in an Internet of things environment. For example, the smart device 450 may be at least one of a television, digital video disk (DVD) player, audio device, refrigerator, air-conditioner, cleaner, oven, microwave oven, washing machine, air cleaner, set-top box, home automation control panel, security control panel, media box (e.g., Samsung HomeSync™, Apple Television™, or Google Television™), game console (e.g., Xbox™, PlayStation™), electronic dictionary, electronic key, camcorder, and electronic frame.

According to various exemplary embodiments of the present disclosure, the external device 420, the ASR device 430, or the NLU device 440 may be integrated into a single device. Alternatively, at least one of the external device 420, the ASR device 430, and the NLU device 440 may be provided as a separate element. For example, the ASR device 430 and the NLU device 440 may be integrated into a single device, and the external device 420 may be provided as a separate device.

Figure 6:
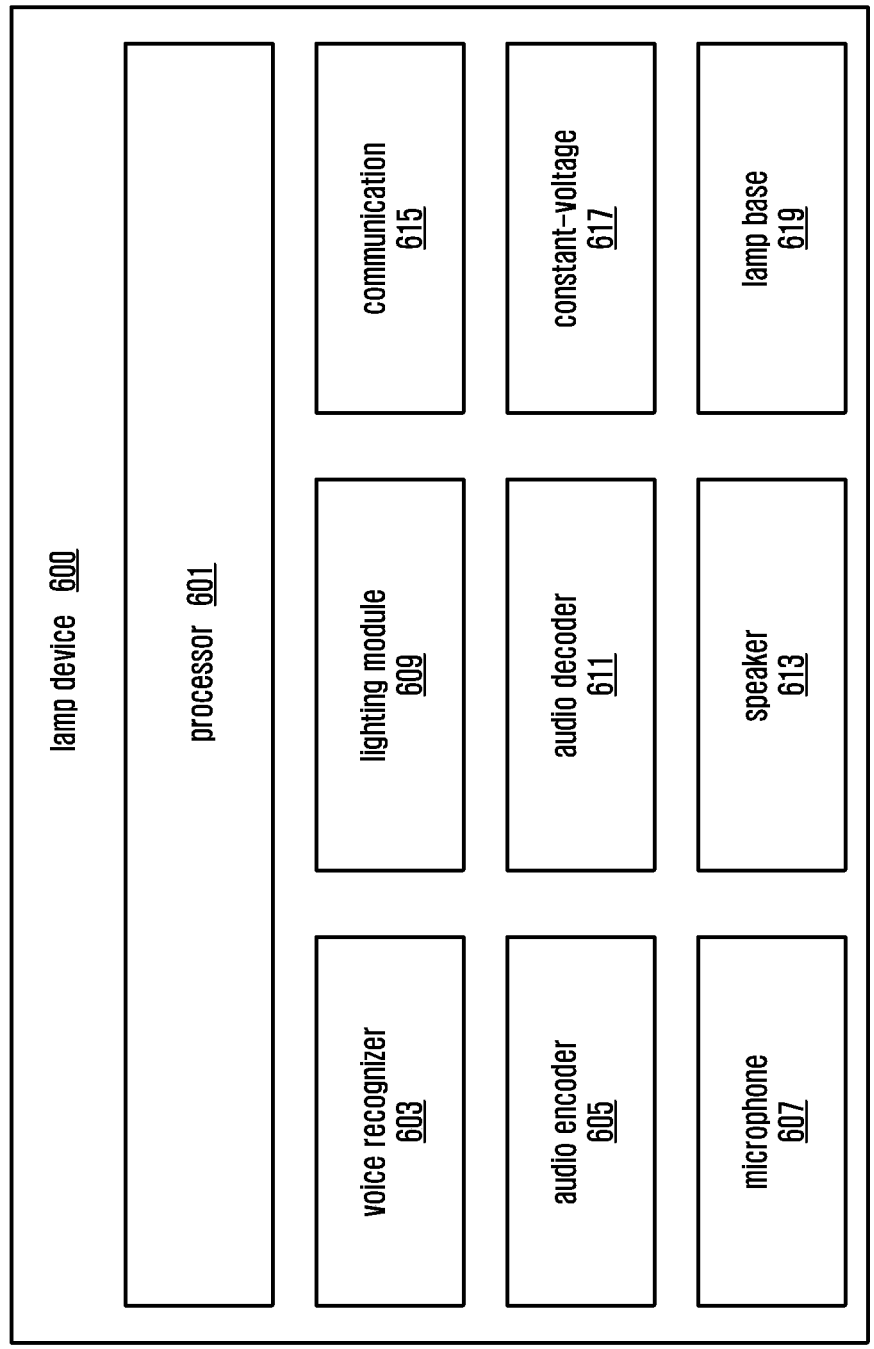
FIG. 6 illustrates a block diagram of a configuration of a lamp device according to an exemplary embodiment of the present disclosure.

FIG. 6 illustrates a block diagram of a configuration of a lamp device according to an exemplary embodiment of the present disclosure.

With reference to FIG. 6, a lamp device 600 according to an exemplary embodiment may include a processor 601, voice recognizer 603, lighting module 609, communication module 615, audio encoder 605, audio decoder 611, constant-voltage transformer 617, microphone 607, speaker 613, or lamp base 619.

The processor 601 may control general operations of the lamp device 600. For example, the processor 601 may control each constituent element of the lamp device 600.

The processor 601 may determine whether or a trigger voice to distinguish a trigger voice and a command voice. When a trigger voice is received, the processor 601 may transfer a signal related to trigger voice reception to the external device 420, generate interruption for activating at least one another lamp device of the external device 420, having received a signal related to trigger voice reception from a specific lamp device 600, having received the trigger voice, and transmit the generated interruption to the at least one another lamp device. According to another exemplary embodiment, when a trigger voice is received, the processor 601 may generate interruption for activating at least one another lamp device and transmit the generated interruption to at least one another lamp devices. According to various exemplary embodiments of the present disclosure, when the specific lamp device 600 receives a trigger voice to be activated, by activating other lamp devices registered at the same location as or a location adjacent to that of the specific lamp device, a user voice and peripheral noise can be effectively received at separated locations, and even if the user moves, voice reception and voice output may follow a user moving line.

The processor 601 may transmit an audio signal corresponding to a command voice to the external device 420 and control a function of the lamp device 600, at least one another lamp device 600, or another device (e.g., the smart device 450) based on a feedback signal transmitted by the external device 420. The processor 601 may generate voice feedback based on a feedback signal transmitted by the external device 420 and control the speaker 613 to output the generated voice feedback. For example, when the processor 601 receives a voice of "Hi, Galaxy" from the user in a sleep mode state, the processor 601 may recognize a corresponding voice to a trigger voice and be activated from a sleep mode to an operation mode in response to the trigger voice. When the processor 601 is activated to an operation mode, the processor 601 may receive a command voice input. The processor 601 may recognize a voice received after the trigger voice to a command.

The processor 601 may further perform a noise filtering operation of removing noise in a voice recognition process. The processor 601 may remove noise from an input audio signal according to known technology. The processor 601 may further perform an operation of determining a user speech location in a voice recognition process. According to an exemplary embodiment, the lamp device 600 may further include an infrared sensor, and in this case, the processor 601 may analyze at least one of intensity of an audio signal and distance information between the user and the lamp device 600 measured through the infrared sensor to detect a user movement, thereby generating information for implementing a natural handover system that controls an operation of at least another lamp device.

The processor 601 may transmit recognized voice data to the external device 420. The processor 601 may transmit location information of the user who speeches a trigger voice, for example, location information of the lamp device 600 to the external device 420. For example, when the user speeches a trigger voice in a living room, the lamp device disposed at the living room may transmit user voice data and user location information to the external device 420. According to an exemplary embodiment, user location information may include information that detects a user movement by analyzing at least one of intensity of an audio signal and distance information between the user and the lamp device 600 measured through infrared sensor. According to another exemplary embodiment, the external device 420 may determine user location information through location information related to the lamp device 600, having transmitted recognized voice data to be registered (or stored) at the memory. The user location information may be provided to the ASR device or NLU device and the ASR device or the NLU device may analyze the recognized voice data based on the provided location information.

After the lamp device 600 transmits voice data to the external device 420, the external device 420 may receive a feedback signal generated based on the voice data and output a voice generated based on the received feedback signal or control a function of the lamp device 600 or another device.

Figure 7:
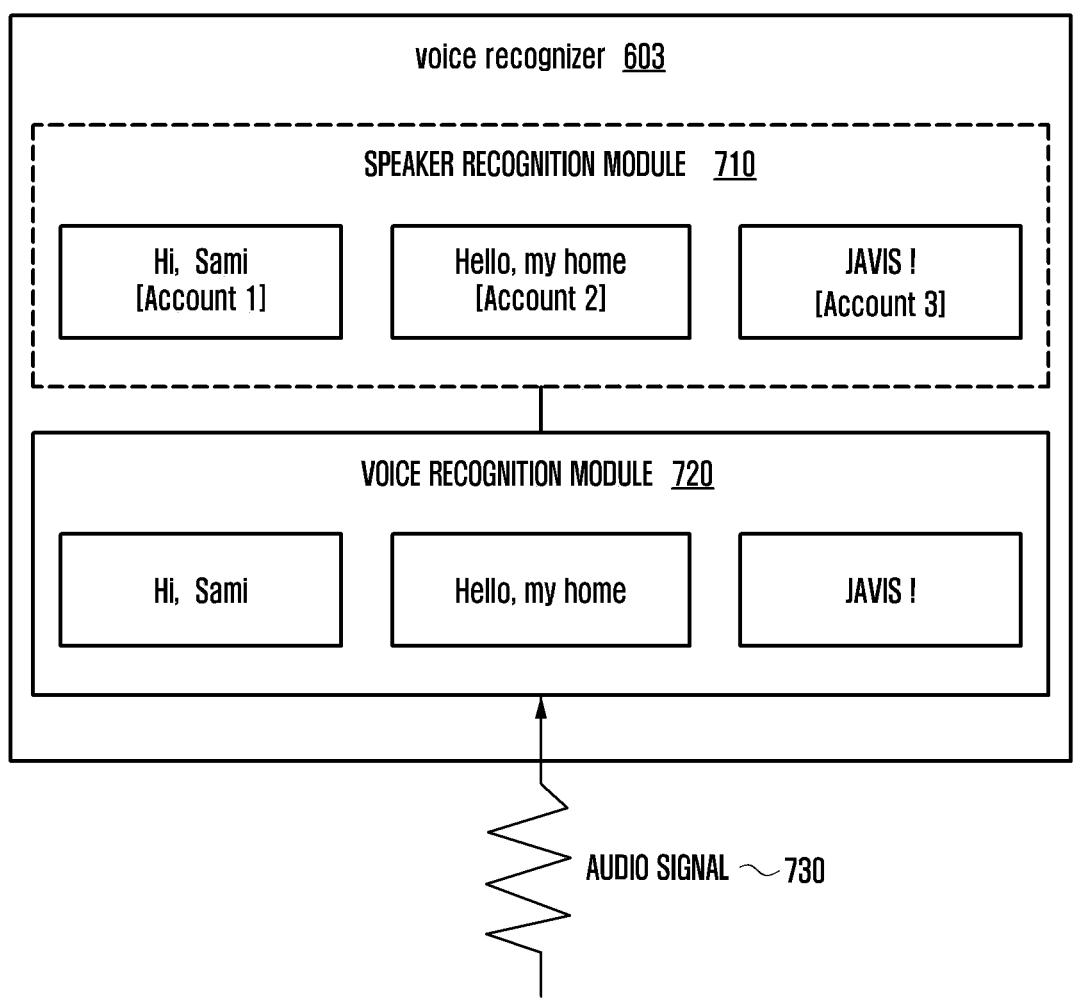
FIG. 7 illustrates a diagram of a voice recognizer that registers a plurality of trigger voice and account information to distinguish a speaker according to an exemplary embodiment of the present disclosure.

FIG. 7 illustrates a diagram of a voice recognizer that registers a plurality of trigger voice and account information to distinguish a speaker according to an exemplary embodiment of the present disclosure.

With reference to FIG. 7, the voice recognizer 603 may support a voice recognition function, and for this reason, the voice recognizer 603 may have a voice recognition module 720. The voice recognition module 720 may include a digital signal processor (DSP) 601. The voice recognition module 720 may analyze an audio signal 730 provided by the microphone 607 to perform voice recognition of the audio signal 730. The voice recognition module 720 may store a plurality of trigger voice models. The voice recognition module 720 may recognize a first trigger voice input by a speaker (or registered speaker). When the voice recognition module 720 recognizes a first trigger voice, the voice recognition module 720 may activate the lamp device 600 in an operation mode and transfer tag information related to a first trigger voice to a speaker recognition module 710.

According to an exemplary embodiment, in order to recognize a speaker who speeches the trigger voice, the voice recognizer 603 may have the speaker recognition module 710. The speaker recognition module 710 may store a plurality of account information, and each account information may represent at least one device information. The speaker recognition module 710 may determine at least one of the plurality of account information based on tag information related to first trigger voice recognition received from the voice recognition module 720. When the voice recognition module 720 recognizes a specific trigger voice, the processor 601 may control the microphone 607 to output a request for a command voice input and perform command recognition of the audio signal 730 received through the microphone 607 after the request time point. The processor 601 may control the audio encoder 605 to convert a voice signal corresponding to a command to a digital signal and control the communication module 615 to transmit a signal including the converted data to at least one external device 420 related to account information determined in the speaker recognition module 710. For example, the processor 601 may register a plurality of trigger information based on a user request at the memory, match user and account information to each trigger information, and register the matched user and account information at the memory. For example, the processor 601 may register first trigger information and match and register a first user and first account information to the first trigger information. Further, the processor 601 may register second trigger information and match and register a second user and second account information to the second trigger information. Further, the processor 601 may register third trigger information and match and register a third user and third account information to the third trigger information.

According to an exemplary embodiment, the voice recognizer 603 may recognize a plurality of trigger information under the control of the processor 601 and transmit a received command voice to an external device related to account information with reference to account information matched to the recognized trigger information. For example, when the voice recognizer 603 recognizes first trigger information, the voice recognizer 603 may transmit a command voice received in an external device, for example, a first user mobile terminal related to first account information with reference to first account information matched to the first account information.

In this document, an operation mode may mean a state in which an operation or a function of the processor 601 is activated. A sleep mode may mean a state in which an operation function of the processor 601 is deactivated. For example, when the processor 601 is in a sleep mode, if a function of detecting reception of a wake-up signal from the outside, a function of converting to an operation mode in response to a wake-up signal, and a constituent element for the functions are excluded, the remaining functions (or operation) and constituent elements may be in a deactivated state (off state). A definition of the operation mode and the sleep mode may be applied to at least one of other constituent elements according to an exemplary embodiment of the present disclosure as well as the processor 601.

According to another exemplary embodiment of the present disclosure, the lamp device 600 may perform general operations of a voice recognition operation under the control of the external device. Hereinafter, an operation of a lamp device 600 according to another exemplary embodiment of the present disclosure will be described in detail.

The processor 601 may receive a voice signal through the microphone 607 and determine whether the voice signal includes a trigger voice. The processor 601 may continuously store a voice signal received through the microphone 607 at a buffer. When the voice signal includes a trigger voice, the processor 601 may be activated from a sleep state to an operation state and generate activation information to transmit the activation information to the external device 420. For example, activation information may include user information recognized based on trigger information or intrinsic identification information of the lamp device 600. The processor 601 may receive first control information from the external device 420 and control the lighting module 609 to output a first lighting signal pattern in response to first control information.

When the external device 420 receives activation information, the external device 420 may activate at least one device for voice recognition in response to the activation information. When a device for voice recognition is activated, the external device 420 may generate first control information and transmit the first control information to the lamp device 600. For example, the first control information may include information in which the external device 420 requests to transmit the received voice signal to the lamp device 600.

The first lighting signal pattern may be an output of light of a first color set by the lighting module 609. Alternatively, the first lighting signal pattern may be an output of light that flickers in a first period set by the lighting module 609. By recognizing the first lighting signal pattern, the user may distinguish that the lamp device 600 is currently receiving a voice command.

The processor 601 may process a voice signal accumulatively stored at a buffer to generate digital voice data and transmit the generated digital voice data to the external device 420. The processor 601 may receive second control information from the external device 420 and control the lighting module 609 to output a second lighting signal pattern in response to second control information. The processor 601 may stop receiving a voice signal in response to the second control information to stop voice recognition. After the processor 601 transmits a voice signal to the external device 420, when second control information is not received for a predetermined time, the processor 601 may retransmit the voice signal to the external device 420.

The external device 420 may perform voice recognition of a voice signal received from the lamp device 600. The external device 420 may recognize a voice signal in a specific time period or a specific meaning unit (e.g., at least one sentence). The external device 420 may generate second control information based on a voice signal recognition result and transmit the second control information to the lamp device 600. For example, second control information may include information in which the external device 420 requests to stop a voice recognition operation to the lamp device 600.

A second lighting signal pattern may be an output of light of a second color set by the lighting module 609. Alternatively, the second lighting signal pattern may be an output of light that flickers in a second period set by the lighting module 609. By recognizing the second lighting signal pattern, the user may distinguish that the lamp device 600 is currently processing a voice command.

The processor 601 may compress an additional voice signal accumulatively stored at a buffer to a time point in which second control information is received and transmit the compressed additional voice signal to the external device 420.

The processor 601 may receive third control information and control to output a third lighting signal pattern in response to the third control information.

The external device 420 may perform a calculation or a data processing based on a recognition result of a voice signal received from the lamp device 600. The external device 420 may generate third control information based on an execution result of a calculation or a data processing and transmit the third control information to the lamp device 600. The processor 601 may output voice feedback through the speaker 613 based on voice feedback data. For example, the third control information may include a control signal and voice feedback based on a calculation or data processing result. The processor 601 may receive voice feedback data from the external device 420 separately from the third control information. Alternatively, the voice feedback data may be included in third control information.

The third lighting signal pattern may be an output of light of a third color set by the lighting module 609. Alternatively, the third lighting signal pattern may be an output of light that flickers in a third period set by the lighting module 609. By recognizing the third lighting signal pattern, the user may distinguish that the lamp device 600 is currently outputting voice feedback based on a voice command processing result.

The lighting module 609 may include a light source module that generates light and a driving circuit that drives a light source module under the control of the processor 601. For example, the lighting module 609 may include a light emitting diode (LED) package and an LED printed circuit board (PCB) that supplies a driving current to the LED package. According to various exemplary embodiments, the lighting module 609 may be configured with an LED lamp, incandescent lamp, fluorescent lamp, high intensity discharge (HID) lamp, or electrodeless discharge lamp. According to various exemplary embodiments, a color of light generated by the lighting module 609 may not be particularly limited. For example, a color of light generated by the lighting module 609 may be various colors such as an orange color, red, blue, and green as well as white.

The communication module 615 may have the same configuration as or a configuration similar to that of the communication module 220 of FIG. 2. For example, the communication module 615 may include at least one of a WiFi module, Bluetooth module, BLE module, ZIGBEE module, Z-WAVE module, GNSS module, NFC module, and RF module. The communication module 615 may be configured with a single module or a plurality of modules. When the communication module 615 is configured with a plurality of modules, the communication module 615 may include a first communication module for communicating with the external device 420 or a second communication module for communicating with at least one another lamp device. For example, the first communication module may be a WiFi module, and the second communication module may be a Bluetooth module.

The audio encoder 605 may convert voice data provided by the microphone 607 to digital voice data under the control of the processor 601. For example, the audio encoder 605 may compress voice data to generate compressed audio stream. The audio encoder 605 may compress voice data using an encoding compression technique such as advanced audio coding (AAC) or audio coding 3 (AC3). The audio encoder 605 may provide processed digital voice data to the communication module 615. Alternatively, the audio encoder 605 may not perform separate compression but digitalize voice data provided by the microphone 607 to generate digital voice data.

The voice recognizer 603 may analyze digital voice data generated by an audio encoder under the control of the processor 601 and determine whether the digital voice data include trigger information. When the digital voice data include trigger information, the processor 601 may generate information (or a signal) for activating the lamp device 600.

The audio decoder 611 may decode voice data received from the external device 420 to analog data under the control of the processor 601. The audio decoder 611 may provide the decoded voice data to the speaker 613.

The constant-voltage transformer 617 may receive power from the lamp base 619 to generate and output a driving voltage for driving each constituent element of the lamp device based on the received power.

The microphone 607 may receive a sound from the outside and generate an audio signal based on the received sound. The microphone 607 may continue to maintain an operation state (on) regardless of a sleep mode/operation mode of the processor 601. Alternatively, the microphone 607 may periodically operate at a specific time interval. The microphone 607 may store the received audio signal at a predetermined time interval at a buffer and provide the audio signal stored at the buffer to the processor 601. A sound input to the microphone 607 may include a voice, a peripheral environment sound of an electronic device, or noise.

According to an exemplary embodiment, the microphone 607 may be formed in an application specific integrated circuit (ASIC) form to support a sound recognition function. For example, the microphone 607 may determine whether an audio signal generated by an input sound is a sound that uses the processor 601 to perform a voice recognition operation. When an audio signal uses a voice recognition operation, the microphone 607 may wake-up the processor 601. For example, when a magnitude (e.g., dB) of the audio signal is a predetermined threshold value or more, the microphone 607 may determine that a voice recognition operation of the processor 601 is used. A determination reference of a sound requiring a voice recognition operation may be a magnitude of an audio signal and a frequency band and may be changed according to a designer intention. The microphone 607 may transfer a driving signal (e.g., wake-up signal), voice recognition request signal, or interruption signal to the processor 601 and additionally transfer an audio signal stored at a buffer.

The speaker 613 may receive voice data from the audio decoder 611 and output voice feedback based on the received voice data.

The lamp base 619 may be connected to an external power line to supply power supplied from the external power line to the constant-voltage transformer 617. For example, the lamp base 619 may receive AC power from the external power line to supply the received AC power to the constant-voltage transformer 617. According to various exemplary embodiments of the present disclosure, a form, design, or size of the lamp base 619 may be variously changed and may not be particularly limited. For example, the lamp base 619 may be at least one of a plurality of lamp bases defined to an international standard, as shown in FIG. 27.

Figure 8:
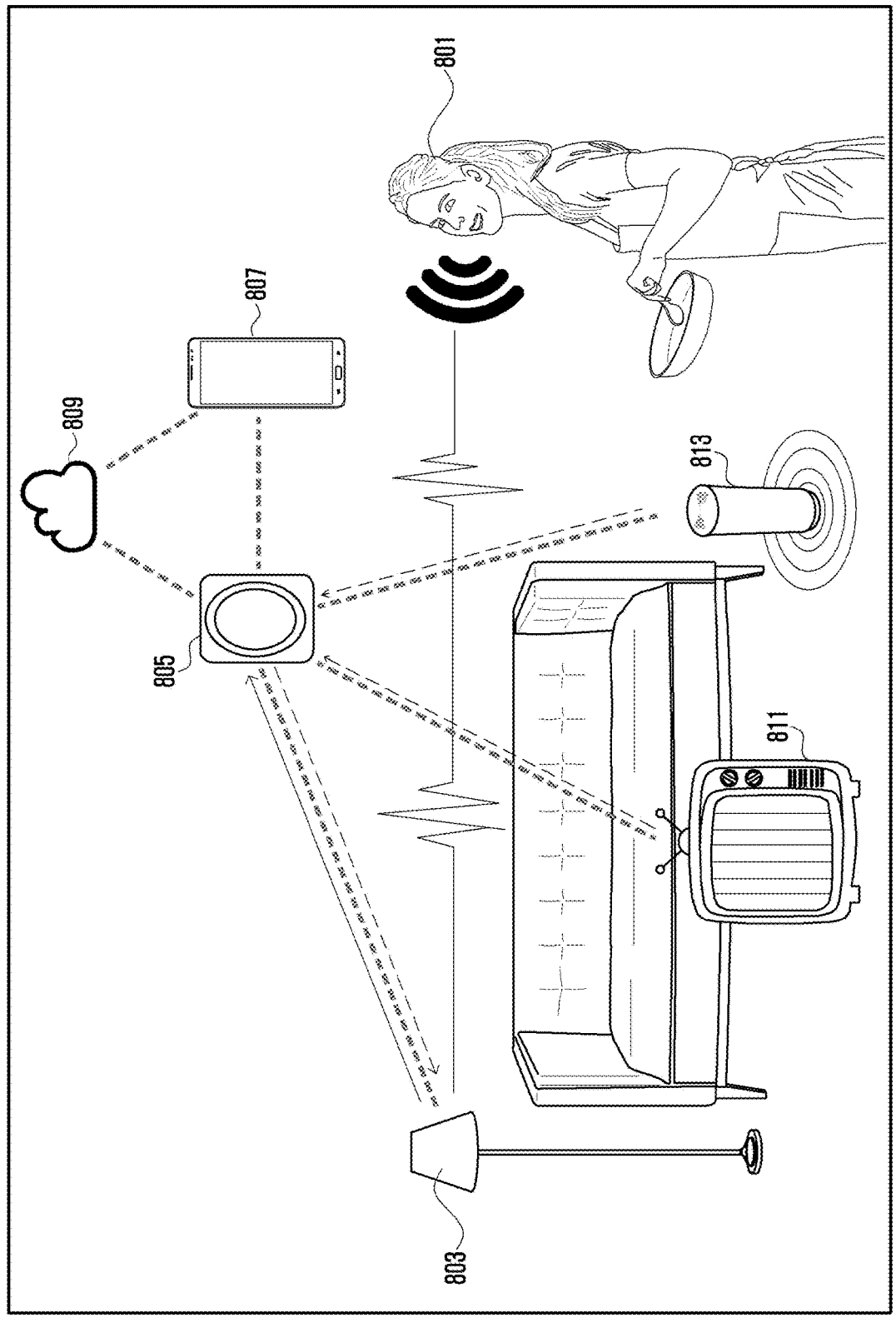
FIG. 8 illustrates a diagram of an operation concept of a voice control system according to various exemplary embodiments of the present disclosure.

FIG. 8 illustrates a diagram of an operation of a voice control system according to various exemplary embodiments of the present disclosure.

With reference to FIG. 8, a lamp device 803 may be implemented into an indoor lamp for lighting a building or a specific space. A user 801 may activate a voice recognition operation of the lamp device 803 with a voice. When a voice recognition operation is activated, the lamp device 803 may receive a voice command of the user 801 through the microphone 607 and transmit data based on the received voice command to an external device 805. The external device 805 may recognize a voice command and output a feedback signal based on the recognized voice command. The external device 805 may be, for example, a server 809, or a user smart phone 807. The feedback signal may include, for example, a control signal for controlling the lamp device 803 or another device. The another device may be, for example, a television 811 or an air cleaner 813 located at a periphery of the user 801 or at least one electronic device (e.g., the electronic device 101) that can communicate with the external device 805. The lamp device 803 may output a voice form of feedback based on the feedback signal received from the external device 805.

According to various exemplary embodiments of the present disclosure, the external device 805 may receive audio data including a user voice from the lamp device 803 and receive original sound source data currently outputting from another device (e.g., television 811, a speaker) located or registered at a location related to the lamp device at substantially the same time. The external device 805 may perform a noise cancellation, noise reduction, or noise suppression operation of the received audio data with reference to the received original sound source data as reference data.

According to various exemplary embodiments of the present disclosure, the external device 805 may receive each audio data in which two or more lamp devices 803 registered at a specific location are received at substantially the same time, analyze the received two or more audio data to perform a noise cancellation, noise reduction, or noise suppression operation, and generate at least one processed audio data. The noise cancellation, noise reduction, or noise suppression operation may be processed with an adaptive noise reduction (ANR) method.

FIGS. 9A to 9E illustrate diagrams of step by step operations of a voice control system according to various exemplary embodiments of the present disclosure and FIGS. 10A-10D illustrate diagrams of an operation state of a lamp device 1001 according to an exemplary embodiment of the present disclosure.

Figure 9A:
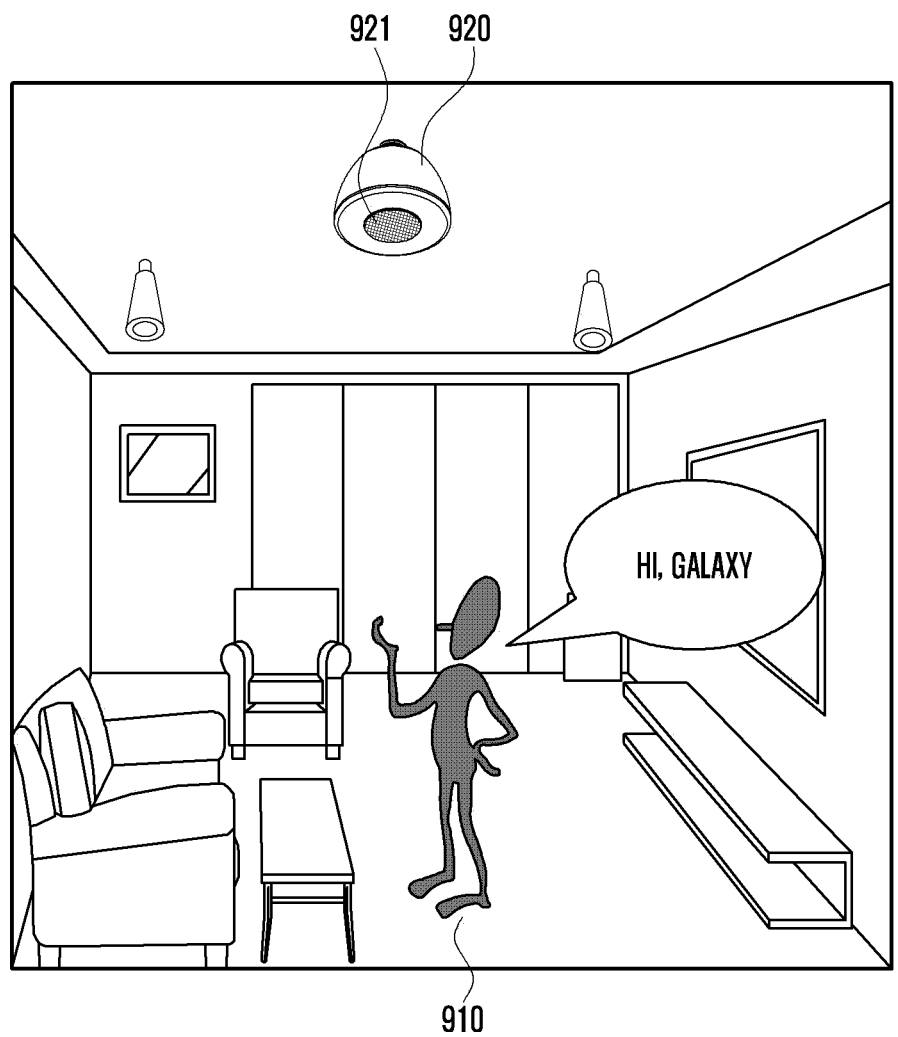
FIGS. 9A to 9E illustrate diagrams of step by step operations of a voice control system according to various exemplary embodiments of the present disclosure.

With reference to FIG. 9A, a lamp device 920 may be implemented into an indoor lamp disposed at a living room ceiling. When there is no voice command of a user 910, the lamp device 920 may perform only a basic function as a lighting device. For example, when there is no voice command of the user 910, a lighting module 921 may be turned on or off under the control of a lighting switch. An on or off operation of the lighting module 921 by a user manipulation of the lighting switch may be independent from a sleep mode and an operation mode of the lamp device 920. For example, light output from the lighting module 921 of the lamp device 920 may have a basically preset color to correspond to use of the lamp device 920, as shown in FIG. 10A. When the lamp device 920 is indoor lighting, the basically preset color may be white or a color similar to white or an orange color or a color similar to an orange color.

When the user 910 says a predetermined trigger voice, the lamp device 920 responds to the trigger voice and thus the processor 601 may be activated and start a voice recognition function. For example, when a first user says "Hi, Galaxy", the lamp device 600 may recognize a corresponding voice to a trigger voice, and the processor 601 of the lamp device 600 may be converted from a sleep mode to an operation mode. When the lamp device 600 recognizes a trigger voice, the lamp device 600 may perform speaker recognition and determine whether a speaker is a registered user. According to various exemplary embodiments, a plurality of trigger voices may be set. For example, the lamp device 600 may distinguish a registered user based on a kind of a recognized trigger voice. The lamp device 600 may operate with at least one of a trusted voice distinguishing method that analyzes an audio characteristic of the trigger voice and a method of distinguishing a vocabulary of the trigger voice as a method of distinguishing a registered user based on the trigger voice kind. For example, when a second user says "Hi, Jarvis", the lamp device 600 may recognize a corresponding voice to a trigger voice and recognize a speaker to a second user.

Figure 9B:
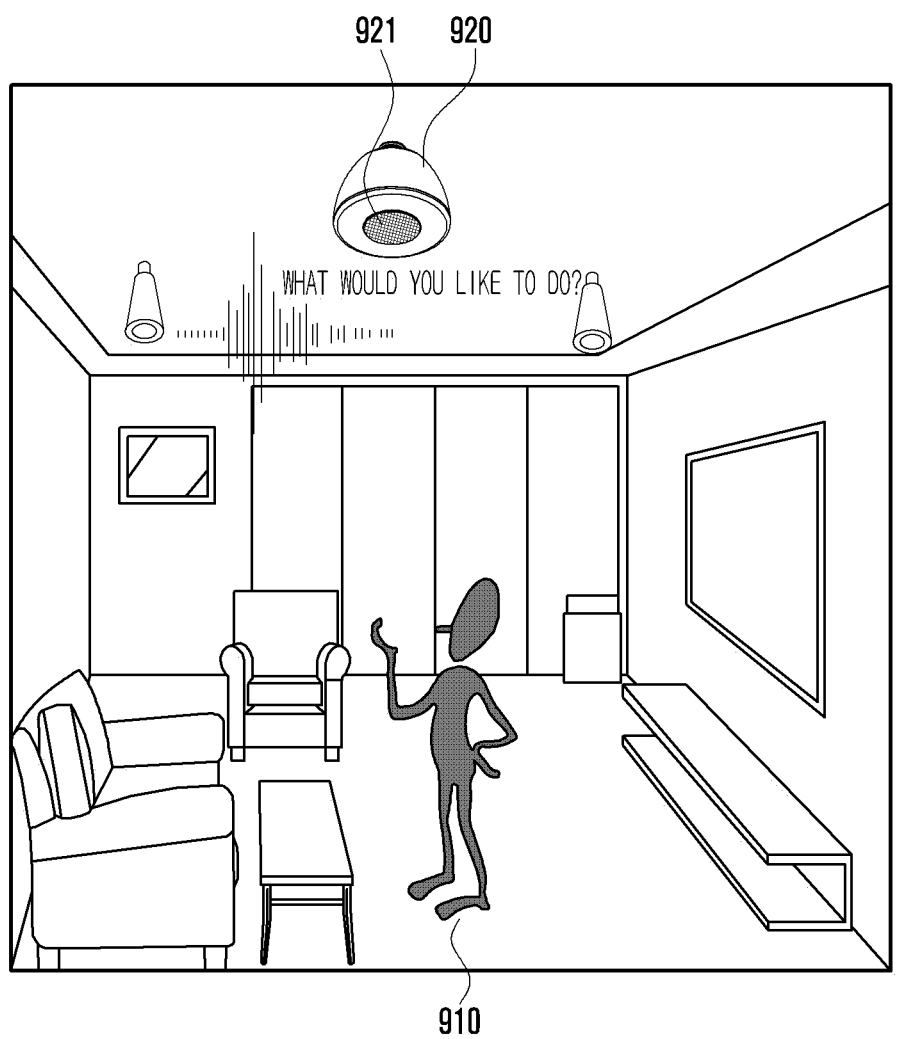

With reference to FIG. 9B, when the processor 601 is activated in response to the trigger voice, the lamp device 920 may request a command input. The lamp device 920 may request a command input in a voice form or may request a command input with an operation of controlling the lighting module 921 to output a predetermined light signal. The predetermined light signal may be a first color or a first lighting signal pattern set to visually notify that the lamp device 920 is currently in a state that requests a command input to the user 910, as shown in FIG. 10B. For example, when the lamp device 600 succeeds in both a trigger voice and speaker recognition, the lamp device 600 may output a voice request of "What would you like to do?".

Figure 9C:

With reference to FIG. 9C, the lamp device 920 may receive a command voice from the user 910. For example, when the first user says "Please adjust a temperature to 20° C.", the lamp device 600 may receive a corresponding voice as a command voice.

Figure 9D:
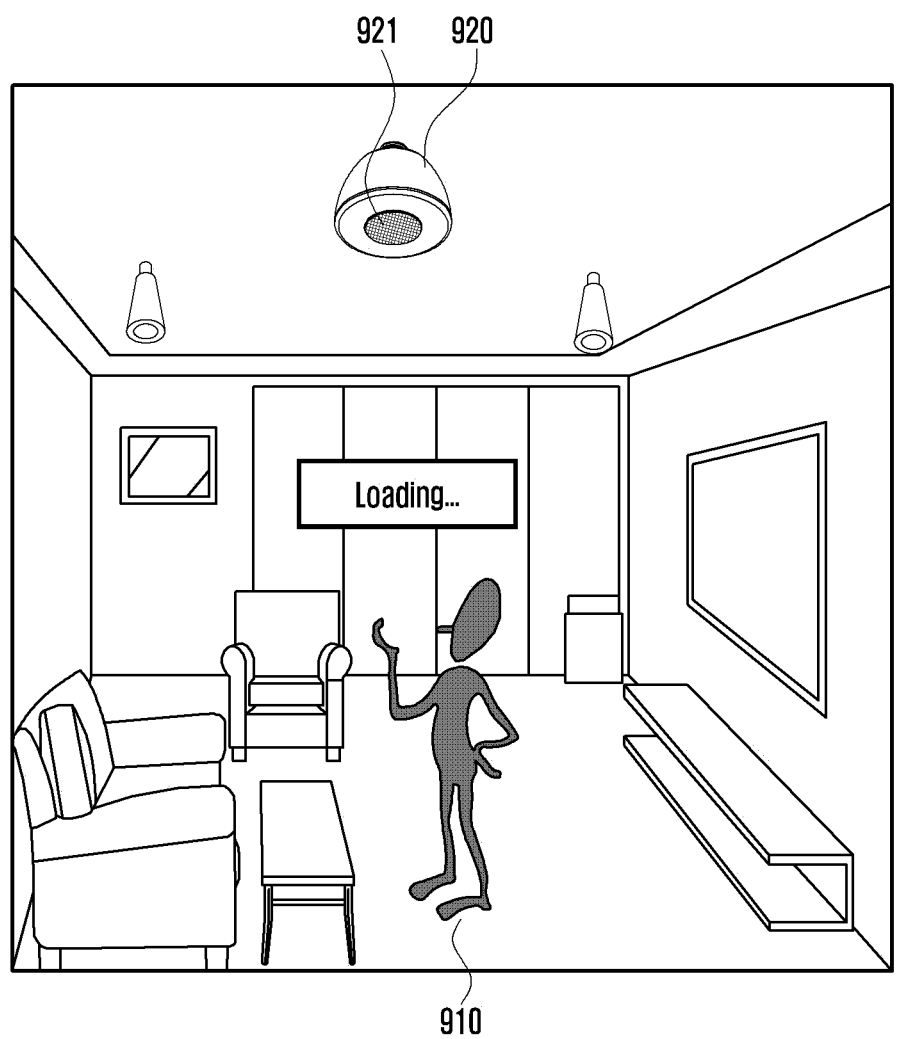

With reference to FIG. 9D, the lamp device 920 may transmit a recognized command voice to the external device 420 and receive a feedback signal from the external device 420. While the lamp device 920 internally performs a processing and stands by feedback signal reception from the external device 420, the lamp device 920 may control the lighting module 921 to output a predetermined light signal. The predetermined light signal may be a second color or a second lighting signal pattern set to visually notify the user 910 that a lamp is currently in a state that communicates with the external device 1003, as shown in FIG. 10C. For example, the lamp device 600 may convert a recognized command voice, for example, an audio signal of "Please adjust a temperature to 20° C." to digital voice data and generate user account information based on recognized speaker information. The lamp device 600 may transmit converted digital voice data, location information of a speaker (e.g., location information of the lamp device 920) or user account information to the external device 420. The external device 420 may communicate with another external device, for example, the ASR device 430 or the NLU device 440 to analyze the received command and output a command signal or a voice feedback signal for controlling a specific device based on an analyzed result.

Figure 9E:
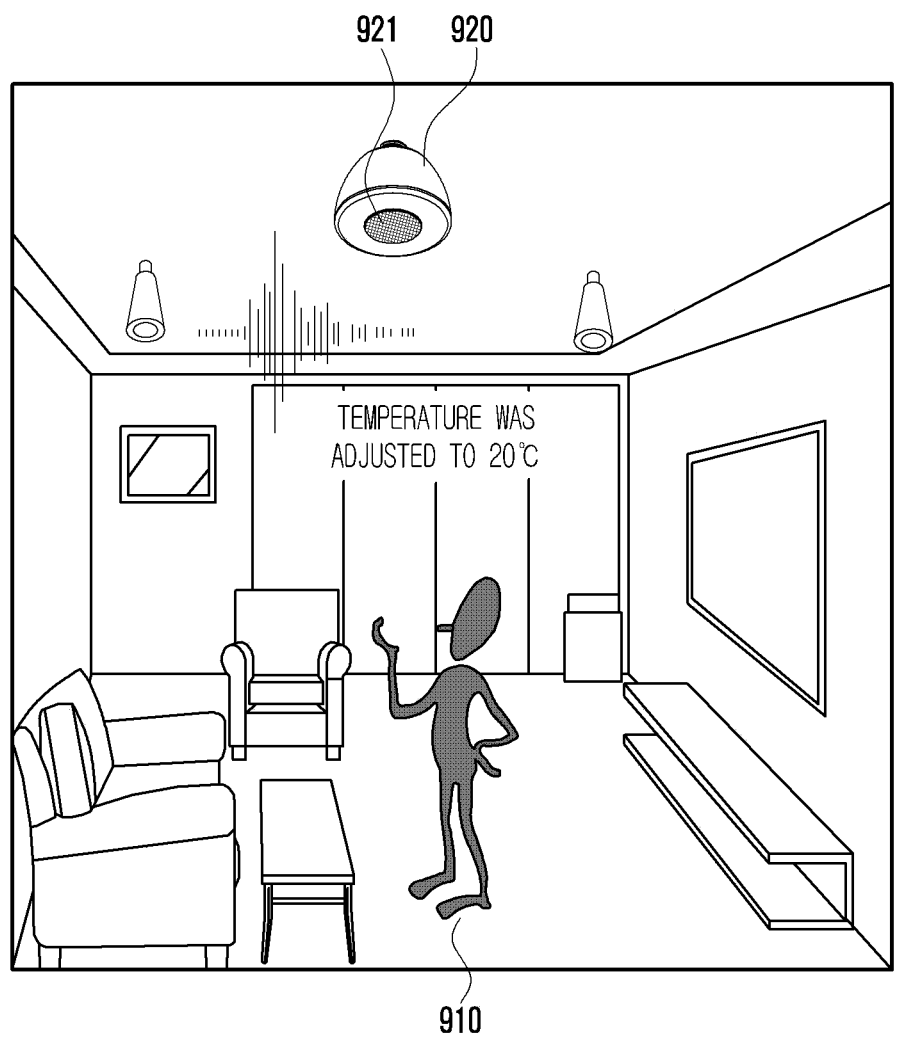

With reference to FIG. 9E, the lamp device 920 may generate voice form feedback based on a feedback signal received from the external device 420 and output the generated voice feedback. A feedback signal, for example, a control signal and voice feedback may include a command signal or a voice feedback signal for controlling a specific device based on an execution result of natural language recognition and natural language processing in the ASR device 430 or the NLU device 440. While outputting voice feedback, the lamp device 920 may control the lighting module 921 to output a predetermined light signal. The predetermined light signal may be a third color or a third lighting signal pattern set to visually notify the user 910 that a lamp is currently in a state that outputs voice feedback, as shown in FIG. 10D. For example, the lamp device 600 may output voice feedback of "a temperature was adjusted to 20° C." through a speaker in response to a feedback signal received from the external device 420. The external device 420 may output a control signal that controls a temperature regulator (e.g., air-conditioner, heater, boiler) simultaneously (or sequentially) with an operation of outputting the voice feedback.

FIGS. 11A-11D illustrates diagrams of an installation method of a lamp device according to an exemplary embodiment of the present disclosure.

With reference to FIG. 11A, in an external device 1110 (e.g., the electronic device 101), an application (hereinafter, App) for providing a voice-based service may be installed. When the App is executed, the external device 1110 may control a communication module to search for a peripheral lamp device 1130. For example, when the App is executed, the external device 1110 may activate the communication module (e.g., WiFi module) to output a call signal that searches for the peripheral lamp device 1130.

With reference to FIG. 11B, when the lamp device 1130 is connected to power, the lamp device 1130 may output a response signal in response to a call signal from the external device 1110. The external device 1110 may receive a response signal from the lamp device 1130 and analyze the response signal to determine a kind or a current state of the lamp device 1130, or whether the lamp device 1130 is registered. When the external device 1110 includes a display, the external device 1110 may display information about the recognized lamp device 1130 through the display. When the recognized lamp device 1130 is unregistered, the external device 1110 may perform an operation of guides installation and registration of the lamp device 1130. For example, when a user 1120 supplies power to the unregistered lamp device 1130, the unregistered lamp device 1130 may output a response signal in response to a call signal of the external device 1110.

With reference to FIG. 11C, the external device 1110 may perform a connection to the lamp device 1130 based on a response signal from the lamp device 1130. If the lamp device 1130 is unregistered, the external device 1110 may transmit a guide signal for guiding installation of the lamp device 1130. The lamp device 1130 may output a guide voice based on a guide signal received from the external device 1110. For example, the lamp device 1130 may output a voice of "connecting to the device. Please wait a moment" according to an audio signal included in the guide signal. Alternatively, the lamp device 1130 may output a voice, for example, "Please say a name of a location in which a bulb is installed." of a request of information about a location thereof.

With reference to FIG. 11D, when the user 1120 inputs a location in which the lamp device 1130 is installed, for example, a "kitchen" with a voice, the lamp device 1130 may transmit location information to the external device 1110. The external device 1110 receives location information from the lamp device 1130 and maps and stores the received location information and a kind of the corresponding lamp device 1130, thereby completing registration of the lamp device 1130.

FIG. 12A illustrates a perspective view of a lamp device according to an exemplary embodiment of the present disclosure. FIG. 12B illustrates an exploded perspective view of a structure of the lamp device of 12A according to an exemplary embodiment of the present disclosure.

With reference to FIGS. 12A and 12B, a lamp device 1200 according to an exemplary embodiment may be configured in a bulb type. For example, the lamp device 1200 may include a main body 1230 that performs a housing function, a lamp base 1210 formed at one side of the main body 1230 to be inserted into a bulb socket, or a cover 1293 fastened to one side of the main body 1230. The cover 1293 may have a ball shape, for example, a sphere form, may be made of a transparent or translucent material to perform a medium function of discharging light generated in a lighting module 1290 to the outside. According to an exemplary embodiment, at the inside of the main body 1230, the lighting module 1290, a speaker 1270, a communication module, a microphone 1280, a constant-voltage transformer 1240, or a control circuit may be disposed. According to an exemplary embodiment, the control circuit may include a PCB 1251 and audio encoder 1253, audio decoder 1255, and processor 1257 mounted in the PCB 1251.

Figure 13:
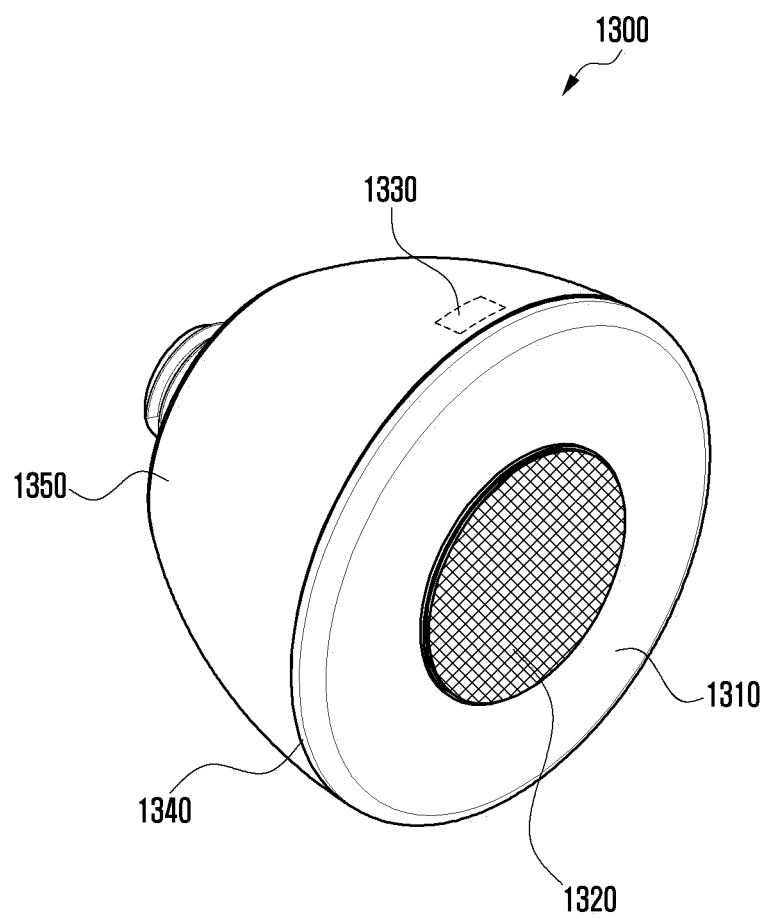
FIG. 13 illustrates a diagram of a modified example of a lamp device configured in a bulb type according to various exemplary embodiments of the present disclosure.

FIG. 13 illustrates a diagram of a modified example of a lamp device configured in a bulb type according to various exemplary embodiments of the present disclosure.

According to various exemplary embodiments of the present disclosure, an external form of a lamp device 1300 may not be limited. For example, when the lamp device 1300 is configured in a bulb type, an external form of the lamp device 1300 may be changed, as shown in FIG. 13. With reference to FIG. 13, the lamp device 1300 may include a main body 1350 that receives a processor 1257, lighting module 1290, communication module 1330, speaker 1320, or microphone 1340 and a cover 1310 disposed at one side of the main body 1350 to emit light generated in the lighting module 1390. For example, an opening portion may be formed at the center of the cover 1310, and in the opening portion, at least a portion of the speaker 1320 may be disposed.

Figure 14:
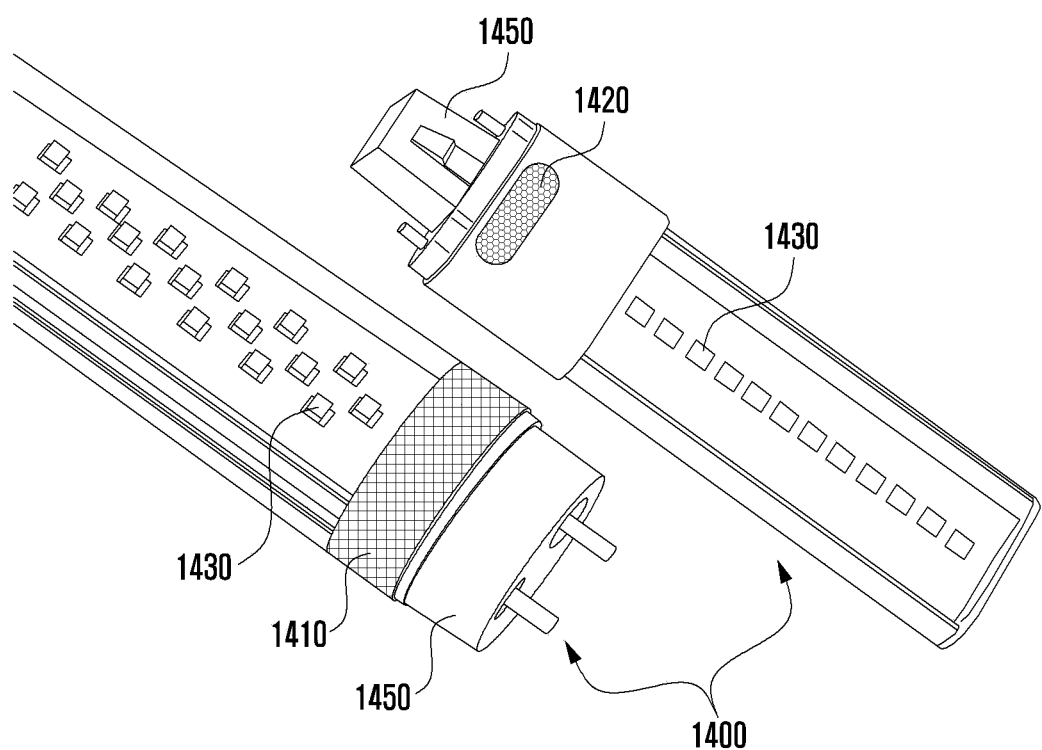
FIG. 14 illustrates a diagram of another modified example of a lamp device configured in a bulb type according to various exemplary embodiments of the present disclosure.

FIG. 14 illustrates a diagram of another modified example of a lamp device configured in a bulb type according to various exemplary embodiments of the present disclosure.

According to an exemplary embodiment of the present disclosure, a lamp device 1400 may be a lamp, having a length in one side direction, such as fluorescent light. With reference to FIG. 14, in the lamp device 1400, a lighting module 1430 that generates light may be disposed in a length direction, and in at least one side of the lighting module 1430, a connector 1450 for receiving power from the outside may be disposed. According to an exemplary embodiment, the processor 1257, a microphone 1420, a speaker 1410, or a communication module may be disposed between the connector 1450 and the lighting module 1430. According to various exemplary embodiments, the lighting module 1430 disposed in a length direction may be configured with a light emitting diode lamp (LED lamp) or a fluorescent lamp.

Figure 15:
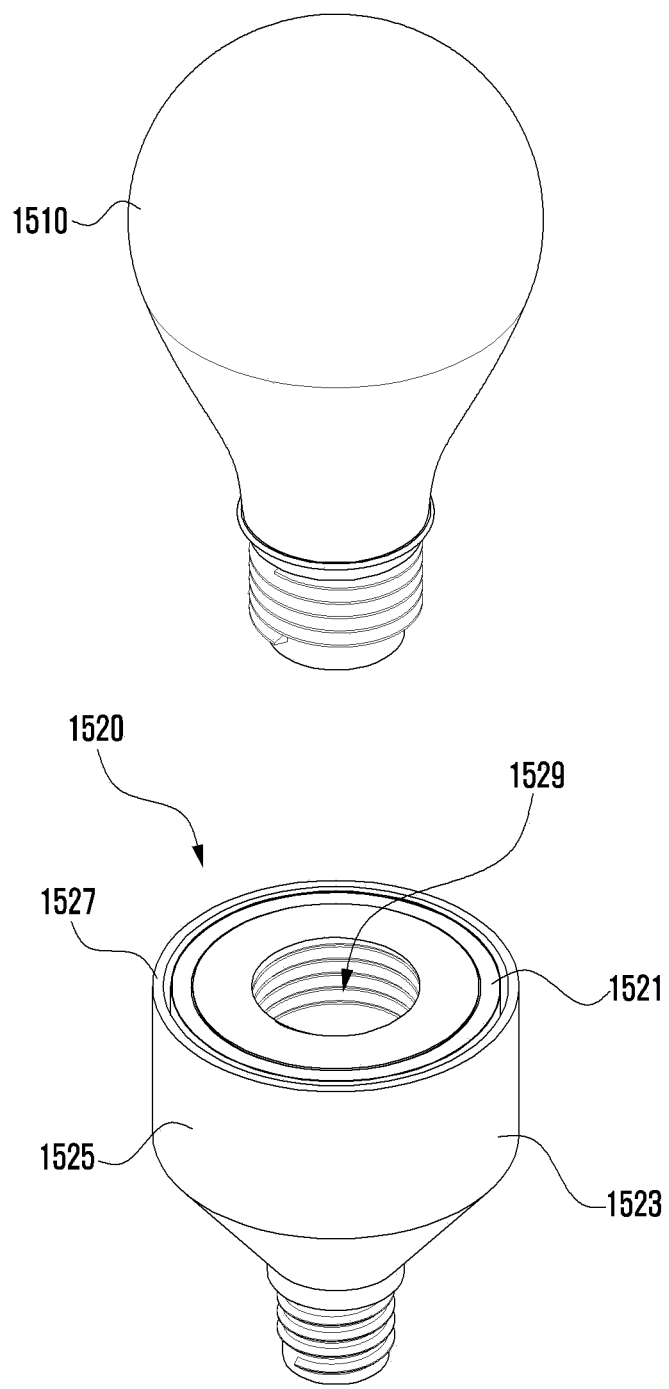
FIG. 15 illustrates a diagram of a lamp device configured in a bulb socket type according to various exemplary embodiments of the present disclosure.

FIG. 15 illustrates a diagram of a lamp device configured in a bulb socket type according to various exemplary embodiments of the present disclosure.

With reference to FIG. 15, a lamp device 1520 according to an exemplary embodiment of the present disclosure may include a general bulb 1510 and a socket fastened thereto. For example, the lamp device 1520 may include a main body 1527 that receives the bulb 1510 and having a power output unit 1529 for supplying power to the lamp base 619, a lighting module 1390, speaker 1525, a communication module, microphone 1523, constant-voltage transformer 1240, or control circuit received within the main body 1527. According to an exemplary embodiment, at a side edge of the main body 1527, at least a portion of the speaker 1525 or at least a portion of the microphone 1523 may be disposed. According to an exemplary embodiment, at an upper surface of the main body 1527, a cover 1521 that emits light generated in the lighting module 1390 may be disposed.

The lamp device 1520 may output various forms of first light based on a user voice command under the control of the processor 601. A function of first light output from the lamp device 1520 may be different from that of second light output from the bulb 1510. For example, second light output from the bulb 1510 lights a specific location or a specific portion, but first light output from the lamp device 1520 may intuitionally notify a user of an operation state of the lamp device 1520 based on a voice command. For example, first light may include various colors of light that instructs an operation state of the lamp device 1520. According to various exemplary embodiments, when the lamp device 1520 is configured with a socket, the lamp device 1520 changes a constant voltage supplied to the bulb 1510 through the power output unit 1529 to control brightness or a color of light output from the bulb 1510, thereby enabling the user to recognize an operation state of the lamp device 1520 through brightness or a color of light output from the bulb 1510. For example, the lamp device 1520 enables the lighting module 1390 to output first light or second light and thus may output an operation state of the lamp device 1520 in a visual information form, but alternatively, the lamp device 1520 may control a constant voltage supplied to the bulb 1510 to control brightness or a color of light output from the bulb 1510, thereby outputting visual information.

According to various exemplary embodiments, an operation state of the lamp device 1520 may include an operation in which the lamp device 1520 receives a user voice command, an operation of processing a received user voice command or an operation of outputting voice feedback based on a processed result. According to an exemplary embodiment, an operation of processing a voice command may include at least one of operation of recognizing a received voice command, operation of identifying a speaker based on the recognized voice command, operation of transmitting information based on an identified speaker or voice command to the external device, operation of receiving feedback information from an external device, and operation of generating voice feedback based on received feedback information and transmitting a signal for controlling another external device.

Figure 16:
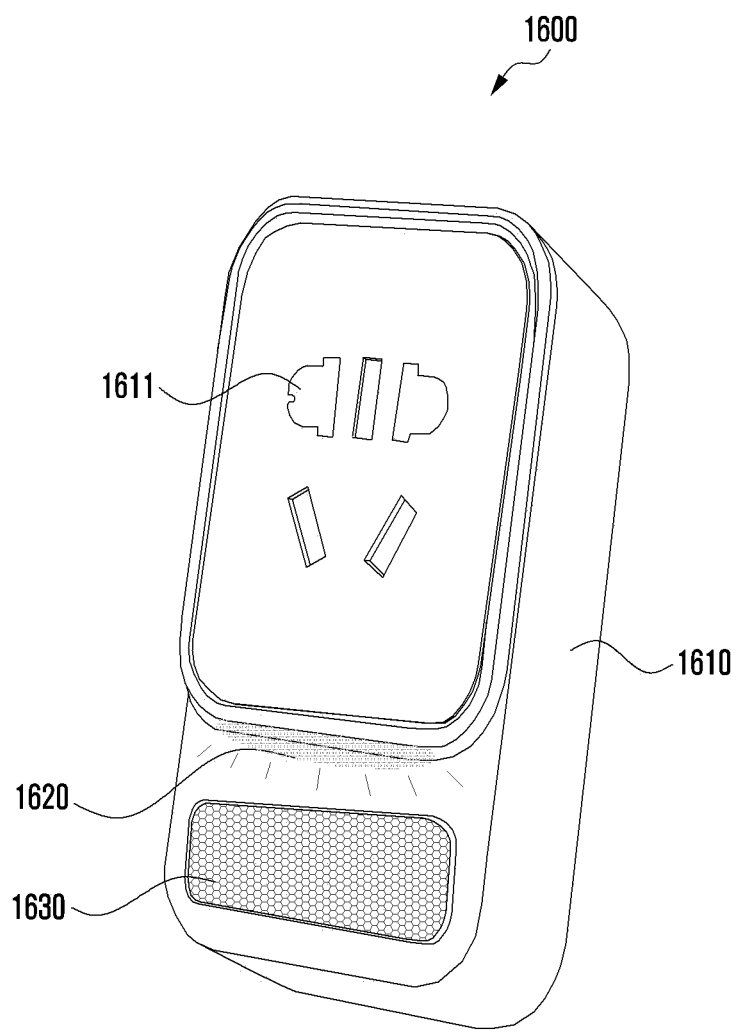
FIG. 16 illustrates a diagram of a lamp device configured in a power socket type according to various exemplary embodiments of the present disclosure.

FIG. 16 illustrates a diagram of a lamp device configured in a power socket type according to various exemplary embodiments of the present disclosure.

With reference to FIG. 16, a lamp device 1600 according to an exemplary embodiment of the present disclosure may be configured with a power socket for supplying power to a power plug of the lamp device 1600 including at least one bulb. For example, the lamp device 1600 may include a main body 1610 having a groove 1611 that inserts a power plug of an electronic device (e.g., the electronic device 101) having at least one bulb or lighting device and a lighting module 1620, speaker 1630, a communication module, microphone 1623, constant-voltage transformer 1240, or control circuit received within the main body 1610. According to an exemplary embodiment, at a front surface of the main body 1610, at least a portion of the lighting module 1620 may be disposed. For example, a front surface of the main body 1610 may be a surface in which the groove 1611 that inserts a power plug is disposed. At least one lighting module 1620 may output various colors of light based on an operation state of the lamp device 1600. According to an exemplary embodiment, at a front surface of the main body 1610, at least a portion of the microphone 1623 or at least a portion of the speaker 1630 may be disposed.

Figure 17:
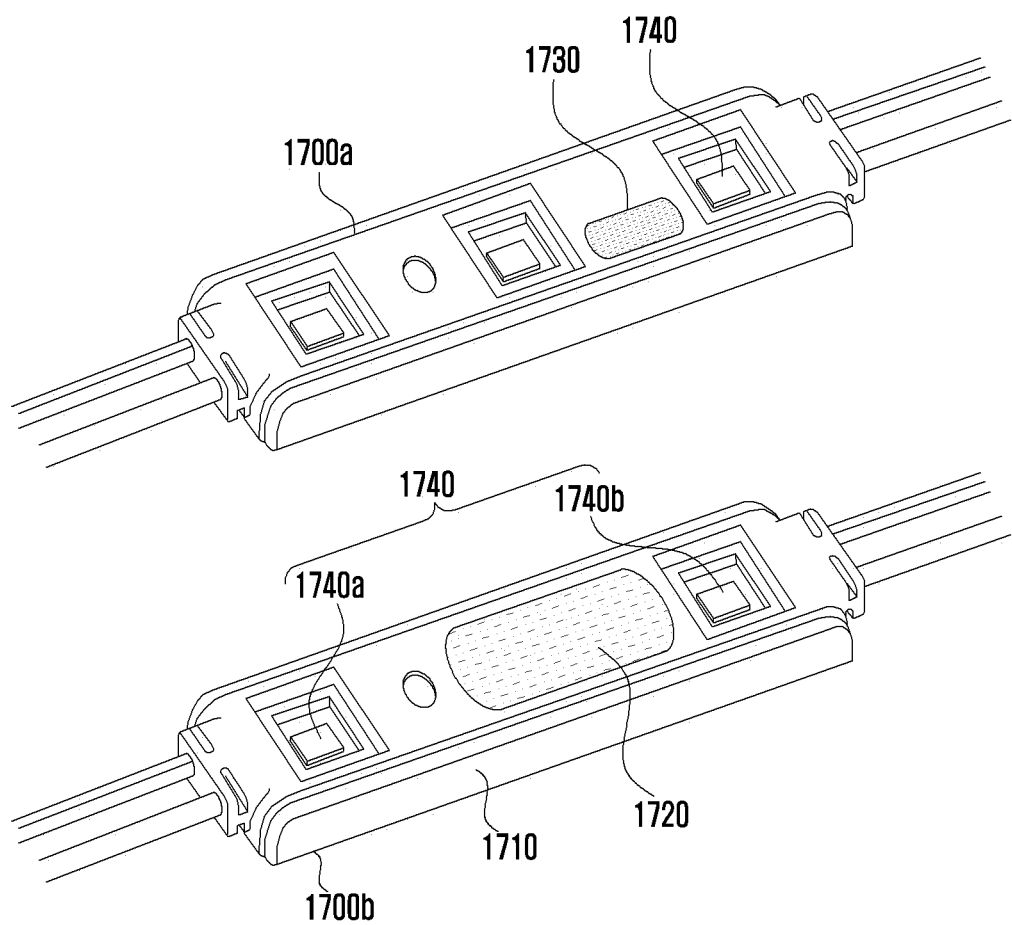
FIG. 17 illustrates a diagram of a lamp device configured in a light emitting diode (LED) module type according to various exemplary embodiments of the present disclosure.

FIG. 17 illustrates a diagram of a lamp device configured in an LED module type according to various exemplary embodiments of the present disclosure.

With reference to FIG. 17, a lamp device 1700 according to an exemplary embodiment of the present disclosure may include a main body 1710 and an LED module including an LED package 1740 disposed in at least a portion of the main body 1710. For example, at a front surface of the main body 1710, at least a portion of the LED package 1740 may be disposed, and at least a portion of a microphone 1730 or at least a portion of a speaker 1720 may be disposed. According to an exemplary embodiment, a plurality of LED packages 1740 may be disposed at a front surface of the main body 1710. At least a portion of a plurality of LED packages 1740a and 1740b may perform a lighting function, and some other portions may intuitionally notify a user of an operation state of the lamp device 1700. For example, the plurality of LED packages 1740a and 1740b may include at least one first LED package 1740a that outputs first light based on an operation state of the lamp device 1700 and at least one second LED package 1740*b* that outputs second light for lighting a specific location or a specific portion under the control of the processor 601.

According to various exemplary embodiments, the lamp device 1700 may include a plurality of LED modules 1700*a* and 1700*b*. The plurality of LED modules 1700*a* and 1700*b* may have the same external form and the same constituent element. According to any exemplary embodiment, a plurality of LED modules 1700*a* and 1700*b* may have different external forms and different constituent elements. For example, at least a portion of the plurality of LED modules 1700*a* and 1700*b* may have only a second LED package to perform only a lighting function and may not have a first LED package. Alternatively, any LED module 1700*b* may have only portions selected from a speaker, communication module, microphone, constant-voltage transformer, or control circuit. For example, a portion of the plurality of LED modules 1700*a* and 1700*b* may have a microphone, but may not have a speaker, and vice versa.

Figure 18:
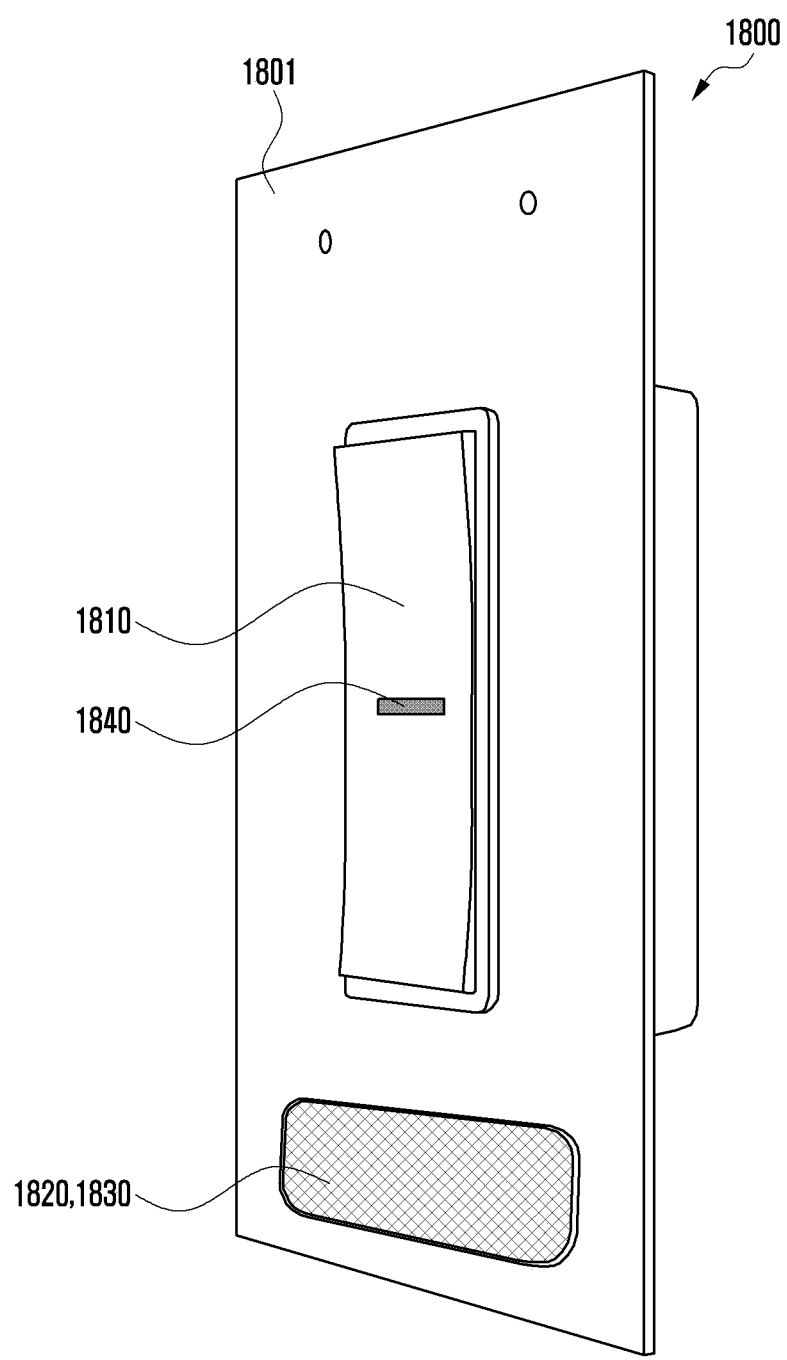
FIG. 18 illustrates a diagram of a lamp device configured in a lighting switch type according to various exemplary embodiments of the present disclosure.

FIG. 18 illustrates a diagram of a lamp device configured in a lighting switch type according to various exemplary embodiments of the present disclosure.

With reference to FIG. 18, a lamp device 1800 according to an exemplary embodiment of the present disclosure may include a main body 1801 having a lighting switch 1810 and an LED module 1840 disposed in at least a portion of the switch 1810. The lamp device 1800 may control on/off of at least one lamp provided within a building. For example, the lamp device 1800 may be disposed at a portion of a wall disposed at the specific space so as to control a lamp disposed at a specific space of a house. According to an exemplary embodiment, LED module 1840, speaker 1820, a communication module, microphone 1830, constant-voltage transformer 1240, or control circuit may be received within a main body of the lamp device 1800. At a front surface of the main body 1801, at least a portion of the LED package 1840 may be disposed, and at least a portion of the microphone 1830 or at least a portion of the speaker 1820 may be disposed. The LED package 1840 may intuitionally notify a user of an operation state of the lamp device 1800. For example, the LED package 1840 may output first light based on an operation state of the lamp device 1800 under the control of the processor. The first light may have a specific color matched to an operation state of the lamp device 1800.

FIG. 19 illustrates a block diagram of a configuration of a lamp device divided into a master and a slave according to an exemplary embodiment of the present disclosure.

A voice-based lamp system according to various exemplary embodiments of the present disclosure may have a plurality of lamp devices 1901 and 1902, and the plurality of lamp devices 1901 and 1902 may have different functions. For example, a portion of the plurality of lamp devices 1901 and 1902 is a master lamp device 1901 and may be directly connected to the external device 420 and transmit and receive information related to a user voice command to and from the external device 420. Further, another portion of the plurality of lamp devices 1901 and 1902 is a slave lamp device 1902 and may perform only a function of receiving a user voice command or a function of outputting a voice signal as feedback to a user voice command.

According to an exemplary embodiment, the master lamp device 1901 and the slave lamp device 1902 may have the same constituent element, as shown in FIG. 19. The master lamp device 1901 and the slave lamp device 1902 each may include a processor 1917, lighting module 1911, communication module 1923, audio encoder 1913, audio decoder 1919, constant-voltage transformer 1925, microphone 1915, speaker 1921, or lamp base 1927. The master lamp device 1901 and the slave lamp device 1902 may have the same external form and configuration, but may be divided according to a connection relation to an external device. For example, the lamp device directly connected to the external device may be the master lamp device 1901. Further, a device that is not directly connected to the external device 420 and connected to only another lamp device (e.g., the master lamp device 1901) may be the slave lamp device 1902.

Figure 20:
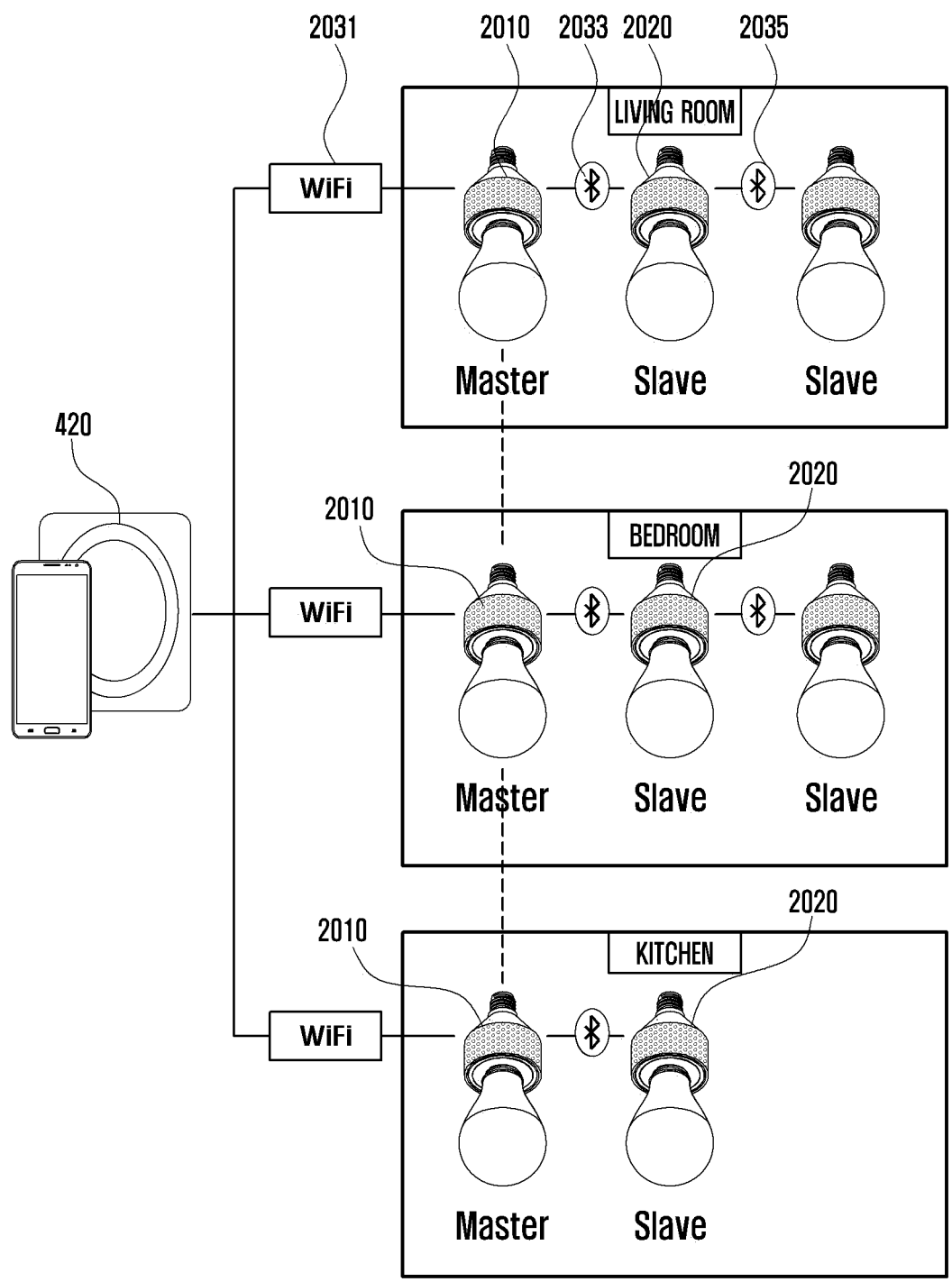
FIG. 20 illustrates a diagram of an arrangement of a plurality of lamp devices according to an exemplary embodiment of the present disclosure.

FIG. 20 illustrates a diagram of arrangement of a plurality of lamp devices according to an exemplary embodiment of the present disclosure.

With reference to FIG. 20, a plurality of lamp devices 2010 and 2020 according to an exemplary embodiment of the present disclosure may be each disposed at a plurality of spaces divided within a building. In an example of FIG. 20, it is assumed that a building is a house. As shown in FIG. 20, a house may be divided into a living room, bedroom, or kitchen, and at each space, the lamp devices 2010 and 2020 may be disposed. According to an exemplary embodiment, at each divided space of a building, a plurality of lamp devices 2010 and 2020 may be disposed. Further, a plurality of lamp devices 2010 and 2020 disposed at each space may include a single master lamp device 2010 connected to the external device 420 and at least one slave lamp device 2020 connected to the master lamp device 2010. In a shown example, a plurality of slave devices 2020 are connected in series, but alternatively, a plurality of slave devices 2020 may be connected in parallel.

According to various exemplary embodiments, a communication method (hereinafter, first connection) 2031 of connecting the external device 420 and the master lamp device 2010, a communication method (hereinafter, second connection) 2033 of connecting the master lamp device 2010 and the slave device 2020, or a communication method (hereinafter, third connection) 2035 of connecting different slave devices 2020 may be the same or different as communication method 2033. For example, the first to third connections may be a method connected by wire communication. Alternatively, the first to third connections may be a method connected by wireless communication. Alternatively, at least a portion of the first to third connections may be wire communication, and the other connections may be wireless communication. Alternatively, the first to third connections may be wireless communication, but a kind of wireless communication may be different. For example, as shown in FIG. 20, the first connection 2031 may be WiFi-based wireless communication, and the second and third connections 2033 and 2035 may be Bluetooth-based wireless communication.

Figure 21A:
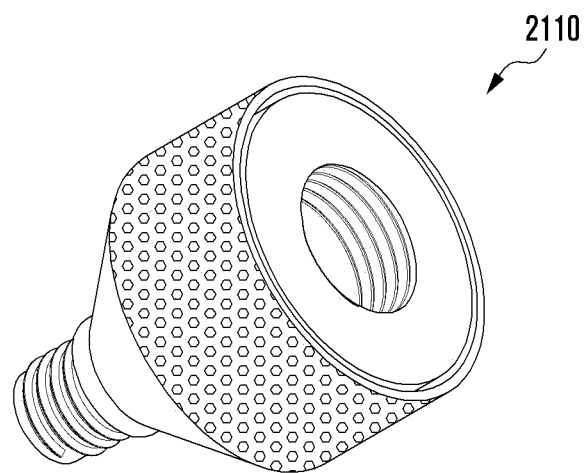
FIGS. 21A and 21B illustrate perspective views of an external form of a master lamp device and a slave lamp device according to an exemplary embodiment of the present disclosure.
Figure 21B:
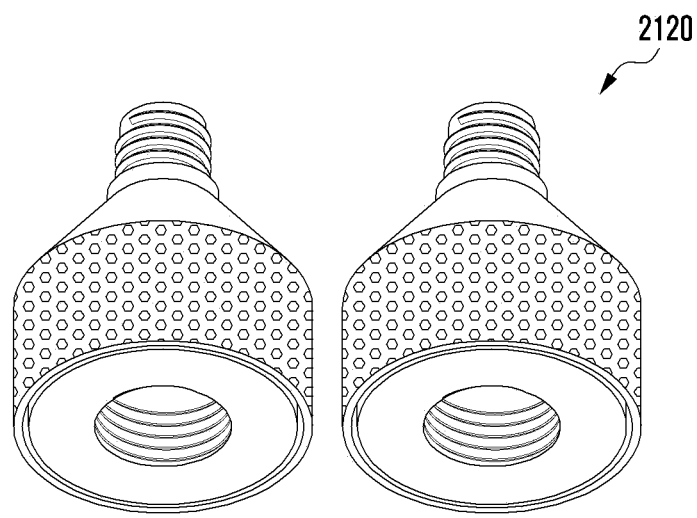

FIGS. 21A and 21B illustrate perspective views of an external form of a master lamp device and a slave lamp device according to an exemplary embodiment of the present disclosure.

With reference to FIGS. 21A and 21B, a master lamp device 2110 and a slave lamp device 2120 have the same external form, but may have different constituent elements.

For example, as shown in FIGS. 21A and 21B, the master and slave lamp devices 2110 and 2120 have a bulb socket type and may have the same or similar external form. FIGS. 21A and 21B illustrate the master and slave lamp devices 2110 and 2120 of a bulb socket type, but a type of the master and slave lamp devices 2110 and 2120 may be changed. For example, the master and slave lamp devices 2110 and 2120 may be configured in any one type of FIGS. 13 to 19.

According to another exemplary embodiment of the present disclosure, the master and slave lamp devices 2110 and 2120 may be configured in a different type. For example, the master slave lamp device 2110 may be configured in a lighting switch type, as shown in FIG. 19, and a plurality of slave lamp devices 2120 may be configured in any one type selected from example shown in FIGS. 13 to 19. For example, the master slave lamp device 2110 may be configured in a lighting switch type, and the slave lamp device 2120 may be configured in a bulb type.

FIG. 22 illustrates a block diagram of a master lamp device and a slave lamp device divided into a master and a slave according to an exemplary embodiment of the present disclosure.

With reference to FIG. 22, a master lamp device 2201 and a slave lamp device 2202 have the same or similar external form, but constituent elements within a main body thereof may be different. For example, the master lamp device 2201 may include a lighting module 2211, processor 2217, first communication module 2223, second communication module 2225, audio encoder 2213, audio decoder 2219, constant-voltage transformer 2227, microphone 2215, speaker 2221, or lamp base 2229. The slave lamp device 2202 may include constituent elements, except for the first communication module 2223, audio decoder 2219, or speaker 2221 unlike the master lamp device 2201. For example, the slave lamp device 2202 may include a lighting module 2211, processor 2217, second communication module 2225, audio encoder 2213, constant-voltage transformer 2227, microphone 2215, or lamp base 2229. According to an exemplary embodiment, the first communication module 2223 may perform wireless communication and communicate with the external device 420. The second communication module 2225 may perform wireless communication and communicate with the slave lamp device 2202. According to an exemplary embodiment, the first communication module 2223 and the second communication module 2225 may support wireless communication of different methods. For example, the first communication module 2223 may be a WiFi module, and the second communication module 2225 may be a Bluetooth module.

Figure 23:
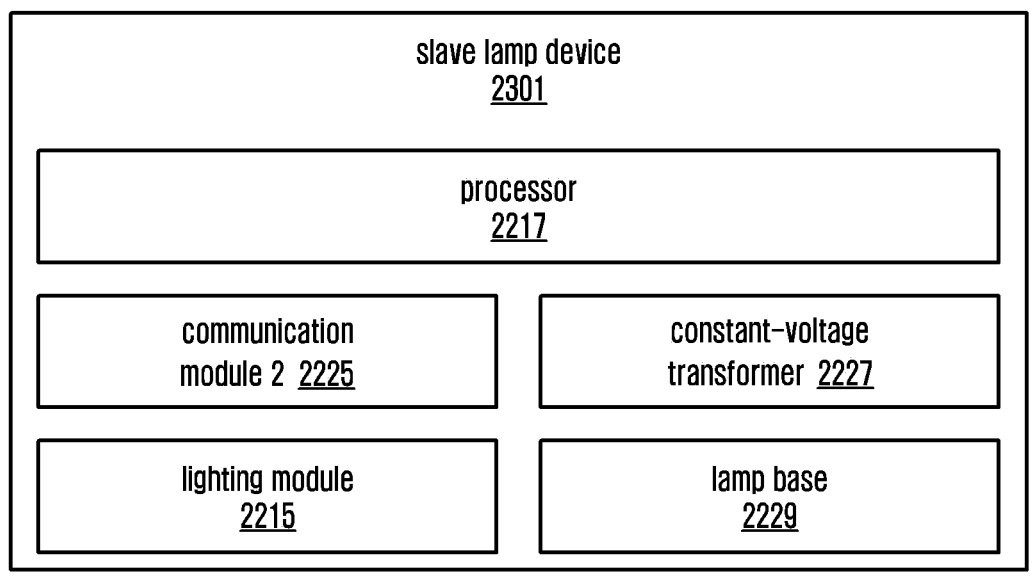
FIG. 23 illustrates a block diagram of a configuration of a slave lamp device according to another exemplary embodiment of the present disclosure.

FIG. 23 illustrates a block diagram of a configuration of a slave lamp device according to another exemplary embodiment of the present disclosure.

With reference to FIG. 23, a slave lamp device 2301 may include constituent elements, except for a first communication module 2323, audio encoder 2313, audio decoder 2319, microphone 2315, or speaker 2321 unlike a master lamp device 2301 of FIG. 23. For example, the slave lamp device 2301 may include a processor 2317, second communication module 2325, constant-voltage transformer 2327, lighting module 2311, or lamp base 2329.

According to an exemplary embodiment, the lighting module 2311 of the slave lamp device 2301 may be controlled by a processor of the slave lamp device 2301, and alternatively, only the lighting module 2311 among constituent elements of the slave lamp device 2301 may be separately controlled by the master lamp device 2301.

A method of driving a lamp device according to various exemplary embodiments of the present disclosure includes operation of receiving an audio signal; operation of performing voice recognition of a first audio signal among the received audio signals; operation of generating an activation signal based on the voice recognition result; operation of transmitting the activation signal to the external device; operation of receiving a first control signal from the external device; and operation of transmitting a second audio signal among the received audio signals to the external device in response to the first control signal.

The method may further include operation of receiving a second control signal from the external device; and operation of stopping transmitting the second audio signal in response to the second control signal.

The method may further include operation of receiving a third control signal including voice feedback information from the external device; and operation of outputting a voice feedback signal through a speaker based on the third control signal.

The method may further include operation of outputting a first light type through a lighting module based on the first control signal; operation of outputting a second light type through the lighting module based on the second control signal; and operation of outputting a third light type through the lighting module based on the third control signal.

The first audio signal may include a trigger voice, and operation of performing voice recognition of a first audio signal among the received audio signals may include operation of determining whether the first audio signal includes a trigger voice stored at a memory.

The second audio signal may include an audio signal after a segment in which the trigger voice is included among the received audio signals.

The second audio signal may be a voice signal including a natural language sentence spoken by the user.

The voice feedback signal may include a signal generated by a natural language understanding (NLU) device, natural language processing (NLP) device, or artificial intelligence (AI) device in response to the second audio signal.

The lamp device may include a first communication circuit and a second communication circuit that support wireless communication of different methods, wherein the method may further include communicating with the external device through the first communication circuit operate; and communicating with another lamp device through the second communication circuit.

A method of driving a lamp device according to various exemplary embodiments of the present disclosure include operation of receiving a first control signal generated in response to activation information of another lamp device from an external device, operation of controlling a lighting module to output a first light type in response to the first control signal, operation of receiving an audio signal to transmit the audio signal to the external device, operation of controlling the lighting module to output a second light type in response to a second control signal received from the external device, operation of stop performing the voice recognition, and operation of controlling to output a third light type in response to a third control signal received from the external device and outputting voice feedback through the speaker.

Figure 24:
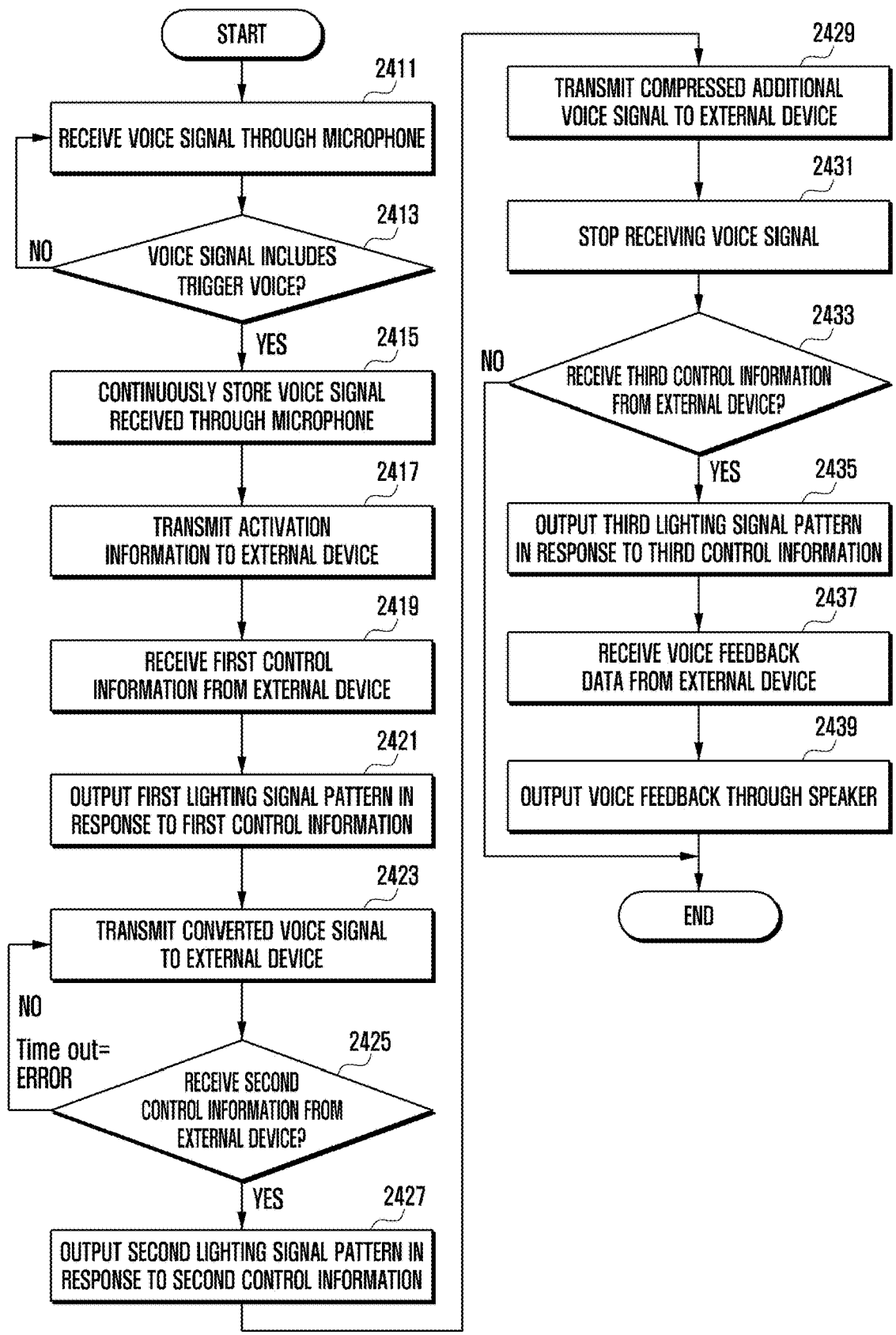
FIG. 24 illustrates a flowchart of an operation of a lamp device according to an exemplary embodiment of the present disclosure.

FIG. 24 illustrates a flowchart of an operation of a lamp device according to an exemplary embodiment of the present disclosure.

The processor 601 may receive a voice signal through the microphone 607 at operation 2411.

The processor 601 may determine whether the voice signal includes a trigger voice at operation 2413.

The processor 601 may continuously store a voice signal received through the microphone 607 at a buffer at operation 2415.

If the voice signal includes a trigger voice, the processor 601 may be activated from a sleep state to an operation state at operation 2417. When the processor 601 is activated, the processor 601 may generate activation information and transmit the activation information to the external device 420. For example, the activation information may include user information recognized based on trigger information or intrinsic identification information of the lamp device 600.

The processor 601 may receive first control information from the external device 420 at operation 2419. When activation information is received, the external device 420 may activate at least one device for voice recognition in response to the activation information. When the device for voice recognition is activated, the external device 420 may generate first control information and transmit the first control information to the lamp device 600. For example, the first control information may include information in which the external device 420 requests to transmit a received voice signal to the lamp device 600.

The processor 601 may control the lighting module 609 to output a first lighting signal pattern in response to first control information at operation 2421. For example, the first lighting signal pattern may be an output of light of a first color set by the lighting module 609. Alternatively, the first lighting signal pattern may be an output of light that flickers in a first period set by the lighting module 609. By recognizing the first lighting signal pattern, the user may distinguish that the lamp device 600 is currently recognizing a voice command. According to various exemplary embodiments, the processor 601 may output the first lighting signal pattern based on the activation operation regardless of whether first control information is received. For example, when the voice signal includes a trigger voice, even if first control information is not received from the external device 420, the processor 601 may control the lighting module 609 to output a first lighting signal pattern corresponding to the first control information.

The processor 601 may convert a voice signal accumulatively stored at a buffer to a digital signal and transmit the converted voice signal to the external device 420 at operation 2423.

The processor 601 may receive second control information from the external device 420 at operation 2425. The external device 420 may perform voice recognition of a voice signal received from the lamp device 600. The external device 420 may recognize a voice signal in a specific time period or a specific meaning unit (e.g., at least one sentence). The external device 420 may generate second control information and transmit the second control information to the lamp device 600 based on a voice signal recognition result. For example, the second control information may include information in which the external device 420 requests to stop a voice recognition operation to the lamp device 600.

After transmitting a voice signal to the external device 420, when second control information is not received for a predetermined time, the processor 601 may retransmit the voice signal to the external device 420 at operation 2425.

The processor 601 may control the lighting module 609 to output a second lighting signal pattern in response to second control information at operation 2427. For example, the second lighting signal pattern may be an output of light of a second color set by the lighting module 609. Alternatively, the second lighting signal pattern may be an output of light that flickers in a second period set by the lighting module 609. By recognizing a second lighting signal pattern, the user may distinguish that the lamp device 600 is currently processing a voice command.

The processor 601 may compress an additional voice signal cumulatively stored at a buffer to a time point in which second control information is received and transmit the compressed additional voice signal to the external device 420 at operation 2429.

The processor 601 may stop receiving a voice signal in response to the second control information to stop voice recognition at operation 2431.

The processor 601 may receive third control information at operation 2433. The external device 420 may perform a calculation or a data processing based on a recognition result of the voice signal received from the lamp device 600. The external device 420 may generate third control information based on an execution result of a calculation or a data processing and transmit the third control information to the lamp device 600. For example, the third control information may include a control signal and voice feedback based on a result of a calculation or a data processing.

The processor 601 may control to output a third lighting signal pattern in response to the third control information at operation 2435. For example, the third lighting signal pattern may be an output of light of a third color set by the lighting module 609. Alternatively, the third lighting signal pattern may be an output of light that flickers in a third period set by the lighting module 609. By recognizing the third lighting signal pattern, the user may distinguish that the lamp device 600 is currently outputting voice feedback based on a voice command processing result.

The processor 601 may receive voice feedback data from the external device 420 separately from the third control information at operation 2437. Alternatively, voice feedback data may be included in third control information, and in this case, operation 2437 may be omitted.

The processor 601 may output voice feedback through the speaker 613 based on voice feedback data at operation 2439.

Figure 25:
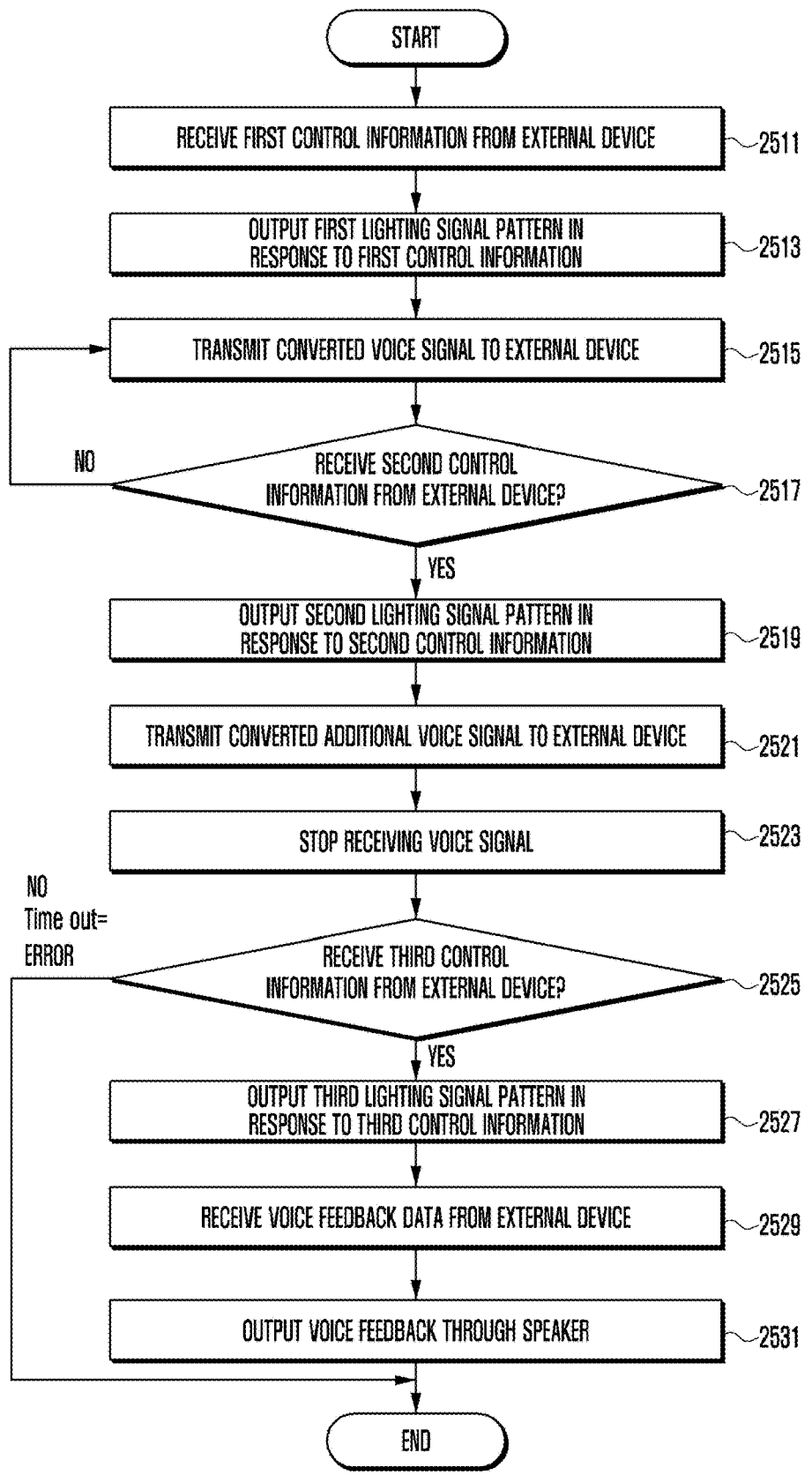
FIG. 25 illustrates a flowchart of an operation of a lamp device according to another exemplary embodiment of the present disclosure.

FIG. 25 illustrates a flowchart of an operation of a lamp device according to another exemplary embodiment of the present disclosure.

When a voice control system according to various exemplary embodiments of the present disclosure includes a plurality of lamp devices, if at least one of the plurality of lamp devices receives voice trigger, a lamp device, having received the voice trigger and a peripheral lamp device of the lamp device, having received voice trigger may be activated. According to various exemplary embodiments of the present disclosure, as peripheral lamp devices are activated by a specific lamp device, a user voice and peripheral noise may be effectively received at separated locations. When an operation of a specific lamp device is activated in response to voice trigger reception of another lamp device, the specific lamp device may operate, as shown in FIG. 25.

With reference to FIG. 25, operations of the lamp device 600 may be the same as or similar to those of the lamp device 600 of FIG. 25, except for some operations.

For example, the lamp device 600 may be activated in response to voice trigger reception of another lamp device, and operations 2511 to 2517 of FIG. 25 may be omitted.

The processor 601 may receive first control information from the external device 420 at operation 2511. For example, the external device 420 may transmit first control information including information that requests to transmit each received voice signal to the another lamp device and the lamp device 600 in response to a receiving operation of a signal transmitted when another lamp device performs operation 2517 of FIG. 25.

The processor 601 may control a lighting module to output a first lighting signal pattern in response to first control information at operation 2513. For example, the first lighting signal pattern may be an output of light of a first color set by the lighting module. Alternatively, the first lighting signal pattern may be an output of light that flickers in a first period set by the lighting module. By recognizing the first lighting signal pattern, the user may distinguish that the lamp device 600 is currently recognizing a user voice command.

The processor 601 may convert a voice signal accumulatively stored at a buffer to a digital signal and transmit the converted voice signal to the external device 420 at operation 2515.

The processor 601 may receive second control information from the external device 420 at operation 2517. The external device 420 may perform voice recognition of a voice signal received from the lamp device. The external device 420 may recognize a voice signal in a specific time period or in a specific meaning unit (e.g., at least one sentence). The external device 420 may generate second control information based on a recognition result of a voice signal and transmit the second control information to the lamp device 600. For example, the second control information may include information in which the external device 420 requests to stop voice recognition operation to the lamp device 600.

The processor 601 may transmit a voice signal to the external device 420, and when second control information is not received for a predetermined time, the processor 601 may retransmit the voice signal to the external device 420 at operation 2517.

The processor 601 may control the lighting module to output a second lighting signal pattern in response to the second control information at operation 2519. For example, the second lighting signal pattern may be an output of light of a second color set by the lighting module. Alternatively, the second lighting signal pattern may be an output of light that flickers in a second period set by the lighting module. By recognizing the second lighting signal pattern, the user may distinguish that the lamp device 600 is currently processing a voice command.

The processor 601 may convert an additional voice signal accumulatively stored at a buffer to a digital signal to a time point in which second control information is received and transmit the converted additional voice signal to the external device 420 at operation 2521.

The processor 601 may stop receiving a voice signal in response to the second control information to stop voice recognition at operation 2523.

The processor 601 may receive third control information from the external device 420 at operation 2525. The external device 420 may perform a calculation or a data processing based on a voice signal recognition result received from the lamp device 600. The external device 420 may generate third control information based on an execution result of a calculation or a data processing and transmit the third control information to the lamp device 600. For example, the third control information may include a control signal and voice feedback based on a result of a calculation or a data processing. For example, the control signal and voice feedback may include a command signal or voice feedback signal for controlling a specific device based on an execution result of natural language recognition and natural language processing in the ASR device 430 or the NLU device 440.

The processor 601 may control to output a third lighting signal pattern in response to the third control information at operation 2527. For example, the third lighting signal pattern may be an output of light of a third color set by the lighting module. Alternatively, the third lighting signal pattern may be an output of light that flickers in a third period set by the lighting module. By recognizing the third lighting signal pattern, the user may distinguish that the lamp device 600 is currently outputting voice feedback based on a voice command processing result.

The processor 601 may receive voice feedback data from the external device 420 separately from the third control information at operation 2529. Alternatively, voice feedback data may be included in the third control information, and in this case, operation 2537 may be omitted.

The processor 601 may output voice feedback through the speaker 613 based on the voice feedback data at operation 2531.

According to a voice control system according to various exemplary embodiments of the present disclosure, the following scenarios are available and a user may receive a voice-based service regardless of a location.

(1) First User Scenario

The user is cooking at a kitchen. The user recognizes that a kitchen temperature is high while cooking and wants to adjust a house temperature. However, because the user is cooking, the user cannot physically control a temperature regulator. In this case, in order to use a voice control system according to various exemplary embodiments of the present disclosure, the user may say a trigger voice of "Hi, Galaxy". At least one lamp device located at the kitchen, for example, a lighting located at a kitchen ceiling may receive "Hi, Galaxy" said by the user through a microphone and be activated from a sleep state to an operation state in response thereto. The sleep state may mean a state in which an operation of a processor for voice recognition regardless of on/off operation of the lighting is deactivated, except for a trigger voice detection recognition operation.

The lighting according to an exemplary embodiment of the present disclosure may distinguish users according to a kind of a trigger voice and output a voice signal that requests a command input to the distinguished user (speaker). For example, the lighting may output a voice signal of "What can I do for you?". In order to lower a kitchen temperature, the user may say a command voice of "Please turn on an air-conditioner and set a temperature to 24° C.". The lighting may recognize the user command voice, compress the recognized command voice, and transmit the recognized command voice to the external device. The external device may analyze the command voice to directly control an air-conditioner or to transmit a control signal to the lighting and to enable the lighting to control the air-conditioner according to a calculation or data processing result. The lighting may receive voice feedback information according to a calculation or a data processing result from the external device and output voice feedback through a speaker based on the received voice feedback information. The voice feedback may include voice information, notifying that the user command was properly performed, such as "the air-conditioner was operated, and a temperature was set to 24° C.".

(2) Second User Scenario

The user is preparing to go out. The user wants to convert a mode of a smart home device or peripheral devices to which Internet of things is applied to a power saving mode while leaving a front door. The user says a trigger voice to activate a voice recognition operation of a lamp device, as in the first user scenario. The user may say a command voice of "Please set to a power saving mode" to the lamp device, and the lamp device may communicate with the external device in the same order as or order similar to that of the first user scenario in response thereto to convert a mode of the smart home device or peripheral devices to which Internet of things is applied to a power saving mode and may output that the requested operation was successfully performed with voice feedback.

(3) Third User Scenario

The user is managing a vehicle. The user recognizes a time to replace vehicle consumable goods and wants to purchase the vehicle consumable goods. The user says a trigger voice to activate a voice recognition operation of the lamp device, as in the first user scenario. The user may say a command voice of "Please order engine oil" to the lamp device, and the lamp device may communicate with the external device in the same order as or order similar to that of the first user scenario in response thereto to provide a user interface for ordering engine oil in a voice form. For this reason, the external device, for example, a user smart phone may be configured to communicate with a provider (online shopping mall) server and service.

(4) Fourth User Scenario

The user wants to call a call taxi before going out. The user says a trigger voice to activate a voice recognition operation of the lamp device, as in the first user scenario. The user may say a command voice of "Please call a call taxi" to the lamp device, and the lamp device may communicate with the external device in the same order as or order similar to that of the first user scenario in response thereto to provide a user interface for calling the call taxi in a voice form. For this reason, the external device, for example, a user smart phone may be configured to communicate with a provider (call taxi company) server and service.

(5) Fifth User Scenario

The user is travelling a foreign country. The user wants to request a service to a foreigner manager at a hotel room, but cannot speak a language of the foreigner manager. In this case, by activating the lamp device, the user may enable the lamp device to interpret the user voice to a language of the foreigner manager. For this reason, the user may say a trigger voice to activate a voice recognition operation of the lamp device, as in the first user scenario. The user may say a command voice of "Please interpret in German" to the lamp device, and the lamp device may communicate with the external device in the same order as or order similar to that of the first user scenario in response thereto to provide a user interface for interpreting a user speech in a voice form.

(6) Sixth User Scenario

While operating a washing machine, the user watches a television in a living room. The user wants to know the remaining operation time of the washing machine. The user may say a trigger voice to activate a voice recognition operation of the lamp device, as in the first user scenario. The user may say a command voice of "When the washing machine operation is finished?" to the lamp device. The external device may control to output voice feedback through the lamp device disposed at a user location based on the user location information received from the lamp device. The lamp device, having received the voice feedback from the external device may communicate with the external device in the same order as or similar order to that of the first user scenario in response thereto to output voice feedback such as "5 minutes are left" as the remaining time of a washing machine operation. According to various exemplary embodiments, the external device may control to output image feedback through a display device disposed at the user location based on the user location information received from the lamp device. The display device, having received the image feedback from the external device may output visual data of "5 minutes are left" as the remaining time of a washing machine operation to image feedback in response to the image feedback.

(7) Seventh User Scenario

The user is taking a shower. The user wants to know a current soccer game score of Korea to Japan. The user may say a trigger voice to activate a voice recognition operation of the lamp device, as in the first user scenario. The user may say a command voice of "What is a current soccer game score of Korea to Japan?" to the lamp device. The external device may control to output voice feedback through the lamp device disposed at a user location based on user location information received from the lamp device. The lamp device, having received voice feedback from the external device may communicate with the external device in the same order as or order similar to that of the first user scenario in response to the voice feedback to output voice feedback of "Korea wins with a score of 5 to 0". According to various exemplary embodiments, the external device may control to output image feedback through a display device disposed at the user location based on the user location information received from the lamp device. The display device, having received the image feedback from the external device may output visual data of "Korea wins with a score of 5 to 0" to image feedback in response to the image feedback.

Figure 26:
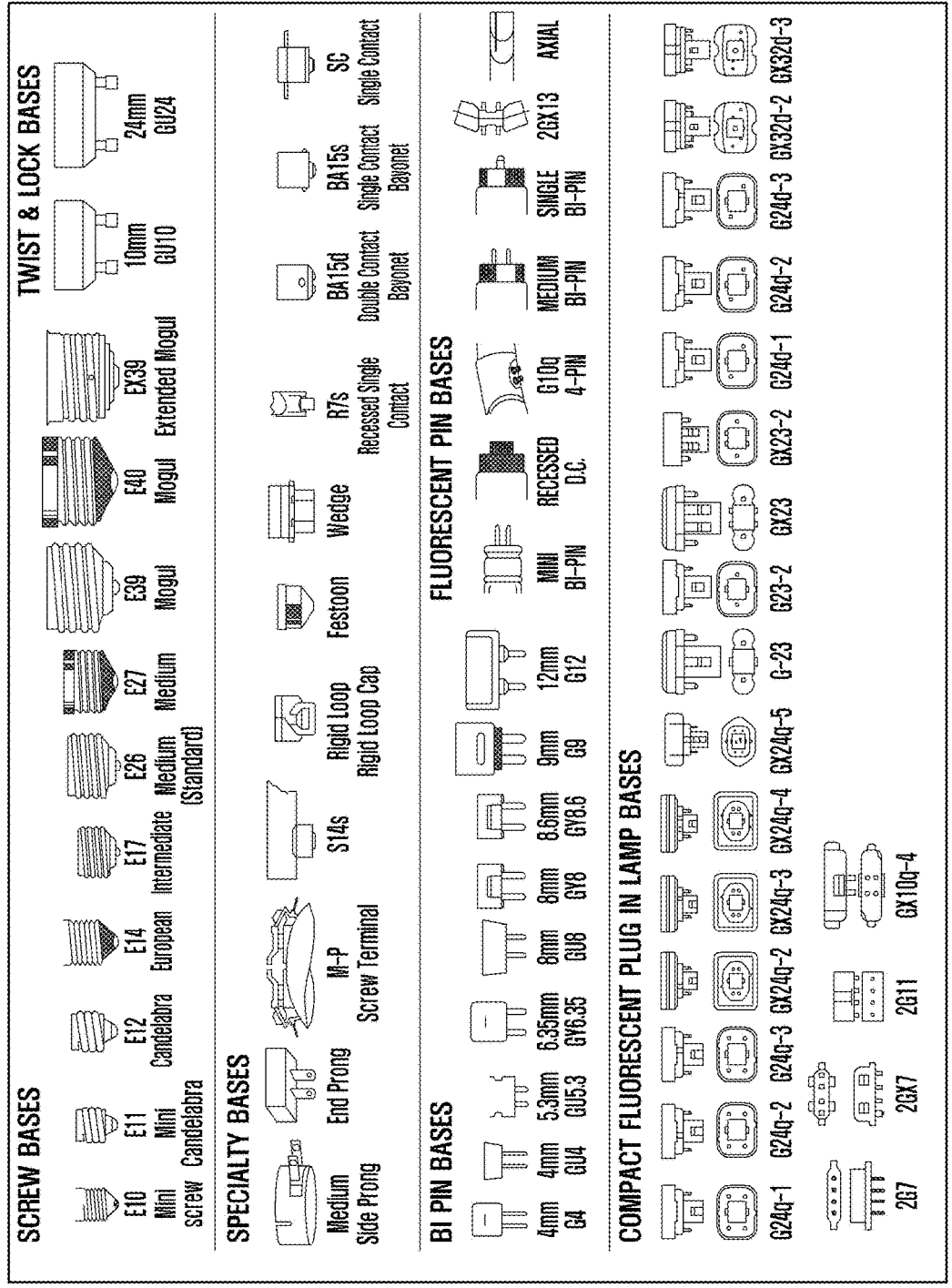
FIG. 26 illustrates a diagram of a form of a lamp base according to various exemplary embodiments of the present disclosure.

FIG. 26 illustrates a diagram of a form of a lamp base according to various exemplary embodiments of the present disclosure.

As described above, according to various exemplary embodiments of the present disclosure, a voice-based service can be provided to a user regardless of a location.

A programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A lamp device, comprising:
   a lighting module;
   a lamp base;
   a memory;
   a microphone;
   a speaker;
   a communication circuit; and
   a processor electrically connected to the lighting module, the lamp base, the memory, the microphone, the speaker, and the communication circuit,
   wherein the processor is configured to:
   receive an audio signal from the microphone;
   perform voice recognition of a first audio signal among received audio signals;
   generate an activation signal based on a voice recognition result;
   transmit the activation signal to an external device through the communication circuit;

receive a first control signal from the external device;
transmit a second audio signal among the received audio signals to the external device in response to the first control signal; and
control the lighting module to output a designated light type from among a plurality of light types based on a state of the lamp device, the state of the lamp device comprising receiving the first control signal.

2. The lamp device of claim 1, wherein the processor is further configured to:
receive a second control signal from the external device; and
stop transmitting the second audio signal in response to the second control signal.

3. The lamp device of claim 1, wherein the processor is further configured to:
receive a third control signal including voice feedback information from the external device, and
output a voice feedback signal through the speaker based on the third control signal.

4. The lamp device of claim 3, wherein the voice feedback signal includes a signal generated by a natural language understanding (NLU) device, natural language processing (NLP) device, or artificial intelligence (AI) device in response to the second audio signal.

5. The lamp device of claim 1, wherein the processor is further configured to:
receive a first control signal from the external device;
output a first light type through the lighting module based on the first control signal;
receive a second control signal from the external device;
output a second light type through the lighting module based on the second control signal;
receive a third control signal from the external device; and
output a third light type through the lighting module based on the third control signal.

6. The lamp device of claim 1, wherein the first audio signal includes a trigger voice, and
wherein the processor is further configured to determine whether the first audio signal includes a trigger voice stored at the memory.

7. The lamp device of claim 6, wherein the second audio signal includes an audio signal of a specific segment determined based on a segment including the trigger voice among the received audio signals.

8. The lamp device of claim 1, wherein the second audio signal includes a natural language sentence spoken by a user.

9. The lamp device of claim 1, wherein the communication circuit includes a first communication circuit and a second communication circuit that support wireless communication of different methods,
wherein the processor is further configured to:
communicate with the external device through the first communication circuit; and
communicate with another lamp device through the second communication circuit.

10. The lamp device of claim 1, further comprising:
an audio encoder configured to process the audio signal to generate digital voice data; and
an audio decoder configured to decode a feedback signal provided from the external device to generate voice feedback.

11. A method of operating a lamp device, the method comprising:
receiving an audio signal;
performing voice recognition of a first audio signal among received audio signals;
generating an activation signal based on a voice recognition result;
transmitting the activation signal to an external device;
receiving a first control signal from the external device;
transmitting a second audio signal among the received audio signals to the external device in response to the first control signal; and
controlling a lighting module of the lamp device to output a designated light type from among a plurality of light types based on a state of the lamp device, the state of the lamp device comprising receiving the first control signal.

12. The method of claim 11, further comprising:
receiving a second control signal from the external device; and
stopping transmitting the second audio signal in response to the second control signal.

13. The method of claim 12, further comprising:
receiving a third control signal including voice feedback information from the external device; and
outputting a voice feedback signal through a speaker based on the third control signal.

14. The method of claim 13, further comprising:
outputting a first light type through a lighting module based on the first control signal;
outputting a second light type through a lighting module based on the second control signal; and
outputting a third light type through the lighting module based on the third control signal.

15. The method of claim 13, wherein the voice feedback signal includes a signal generated by a natural language understanding (NLU) device, natural language processing (NLP) device, or artificial intelligence (AI) device in response to the second audio signal.

16. The method of claim 11, wherein the first audio signal includes a trigger voice, and
performing voice recognition of a first audio signal among the received audio signals includes determining whether the first audio signal includes a trigger voice stored at a memory.

17. The method of claim 16, wherein the second audio signal includes an audio signal after a segment in which the trigger voice is included among the received audio signals.

18. The method of claim 11, wherein the second audio signal includes a natural language sentence spoken by a user.

19. The method of claim 11, wherein the lamp device includes a first communication circuit and a second communication circuit that support wireless communication of different methods, and
wherein the method further comprises:
communicating with the external device through the first communication circuit operate; and
communicating with another lamp device through the second communication circuit.

20. A lamp device, comprising:
a lighting module;
a microphone;
a speaker;
a communication circuit; and
a processor electrically connected to the lighting module, the microphone, the speaker, and the communication circuit;
wherein the processor is configured to:
activate in response to an interruption received from another lamp device;

control the lighting module to output a first light type in response to a first control signal received from an external device;
receive an audio signal to transmit the audio signal to the external device;
control the lighting module to output a second light type and stop performing voice recognition in response to a second control signal received from the external device; and
control to output a third light type and output voice feedback through the speaker in response to a third control signal received from the external device.

* * * * *